United States Patent [19]
Carey et al.

[11] Patent Number: 6,125,196
[45] Date of Patent: Sep. 26, 2000

[54] METHOD FOR IDENTIFYING SUSPECT ITEMS IN AN OUT-OF-BALANCE TRANSACTION

[75] Inventors: Daryl James Carey, Plymouth; Lynn Leppek Ladouceur, Farmington Hills; Daniel W. Muszynski, Royal Oak, all of Mich.

[73] Assignee: Unisys Corporation, Blue Bell, Pa.

[21] Appl. No.: 08/202,860

[22] Filed: Feb. 25, 1994

Related U.S. Application Data

[63] Continuation of application No. 07/956,923, Oct. 2, 1992, abandoned.

[51] Int. Cl.[7] .................................................. G06K 9/00
[52] U.S. Cl. ........................ 382/138; 382/139; 235/379
[58] Field of Search ........................... 382/1, 7, 57, 137, 382/138, 139, 140; 235/379, 425, 437, 470; 364/400, 404, 405, 406

[56] References Cited

U.S. PATENT DOCUMENTS

| | | | |
|---|---|---|---|
| 5,040,226 | 8/1991 | Elischer et al. | 382/7 |
| 5,040,227 | 8/1991 | Lyke et al. | 382/7 |
| 5,120,944 | 6/1992 | Kern et al. | 235/379 |
| 5,151,948 | 9/1992 | Lyke et al. | 382/7 |
| 5,237,158 | 8/1993 | Kern et al. | 235/379 |

FOREIGN PATENT DOCUMENTS

| | | | |
|---|---|---|---|
| 0446633 | 9/1991 | European Pat. Off. | G06K 9/03 |

*Primary Examiner*—Bhavesh Mehta
*Attorney, Agent, or Firm*—Beth L. McMahon; Charles A. Johnson; Mark T. Starr

[57] ABSTRACT

A method for detecting the most likely source of an error in a document image processing system which processes sets of related documents. A set of characteristics is selected as being indicative that the document image, or item, is the source of the error. Each of the characteristics is assigned a weight, wherein the weight is in proportion to the likelihood that an item exhibiting the characteristic is the source of error. The items are ranked according to the characteristics exhibited by each item.

6 Claims, 24 Drawing Sheets

J. J. PATRICK  
XXXX XXXX  
XXX XXXX XXXXX
536

January 10.19

PAY TO   Unisys Payment Processing System    $ 10.00

Ten and 00/100 - - - - - - - - - - - - - - - - - - - - - - - -   Dollars

ANY BANK AND TRUST COMPANY

Not Valid

DEPOSIT TICKET          CASH

ANY BANK AND TRUST COMPANY

DATE_____ 19___          Checks

SIGNATURE

ACE INSURANCE                TOTAL 50.00  DEP DDA JAN 12 01   DEPOSIT

| Cancel | Help | Flip & Rotate | Flip | Rotate 90° |
|---|---|---|---|---|
| CANCELS THE CURRENT FUNCTION. | BRINGS UP AN ONLINE DESCRIPTION OF WHAT ANY FUNCTION KEY DOES. PRESS THE HELP KEY AND THEN THE KEY IN QUESTION. | DISPLAYS THE IMAGE OF THE OPPOSITE SIDE OF AN ITEM AND TURNS IT 90 DEGREES CLOCKWISE | DISPLAYS THE IMAGE OF THE OPPOSITE SIDE OF AN ITEM. | TURNS AN IMAGE 90 DEGREES CLOCKWISE WITHIN AN IMAGE WINDOW. |

| Cancel | Help | Flip & Rotate | Flip | Rotate 90° |
|---|---|---|---|---|
| Shift | Logoff | Accept Out of Balnce | Out of Balnce Rcnsdr | Recon- sider |

90a —

| Shift | Logoff | Acceptably Out of Balance | Out-of-Balance Reconsider | Reconsider |
|---|---|---|---|---|
| COMBINES WITH UP-OR DOWN-ARROW KEYS TO PAGE UP OR DOWN THROUGH CALCULATOR RECORDS. | INDICATES TO THE SYSTEM THAT YOU WISH TO LOG OFF. | MARKS AN OUT-OF- BALANCE BLOCK AS ACCEPTABLE, ALLOWING IT TO BE TREATED AS IF IT WERE IN BALANCE. | MARKS AN OUT-OF- BALANCE BLOCK AS ACCEPTABLE, BUT SUGGESTS THAT YOU LOOK AT IT AGAIN IF YOU CAN. | MARKS AN OUT-OF- BALANCE BLOCK WITH THE RECON- SIDER OPTION. YOU SHOULD LOOK AT IT AGAIN IF YOU CAN. |

| FIG. 17A | FIG. 17B |
|---|---|

Supervisor Function
RESERVED FOR SUPERVISOR USE.

Calculator
CAUSES THE ONLINE CALCULATOR TO BE DISPLAYED IN THE OPERATOR DIALOGUE WINDOW.

↑ MOVES AN IMAGE WITHIN THE WINDOW SO THAT YOU CAN SEE THE TOP PORTION OF THE IMAGE. ALSO MOVES THE HIGHLIGHT BARS UP A LIST OF ITEMS.

↓ MOVES AN IMAGE WITHIN THE WINDOW SO THAT YOU CAN SEE THE BOTTOM PORTION OF THE IMAGE. ALSO MOVES THE HIGHLIGHT BAR UP A LIST OF ITEMS.

← MOVES AN IMAGE WITHIN THE WINDOW SO THAT YOU CAN SEE THE LEFT SIDE OF THE IMAGE.

Clear
CLEARS THE CURRENT INPUT FIELD AND PLACES THE CURSOR IN THE HOME POSITION.

Backspace
MOVES THE CURSOR ONE SPACE TO THE LEFT.

Recall
RETRIEVES THE IMAGE JUST TRANSMITTED IN AMOUNT REKEY.

Pass
REMOVES THE CURRENT BATCH OR DEPOSIT FROM THE SCREEN AND ENABLES YOU TO SELECT ANOTHER ONE.

→ MOVES AN IMAGE WITHIN THE WINDOW SO THAT YOU CAN SEE THE RIGHT SIDE OF THE IMAGE.

FIG. 18A

| FIG. 18A | FIG. 18B | FIG. 18C |

FIG. 18

Dash

PLACES A DASH SYMBOL AT THE POSITION OF THE CURSOR.

Space

PLACES A SPACE AT THE POSITION OF THE CURSOR.

Transaction Code

INDICATES TO THE SYSTEM THAT THE DIGITS JUST ENTERED WERE A TRANSACTION CODE.

Credit/ Enter

INDICATES TO THE SYSTEM THAT THE IMAGE YOU WERE JUST WORKING ON WAS A CREDIT.

Debit/ Enter

INDICATES TO THE SYSTEM THAT THE IMAGE YOU WERE JUST WORKING ON IS A CREDIT. ALSO TRANSMITS MENU AND IMAGE SELECTIONS TO THE SYSTEM.

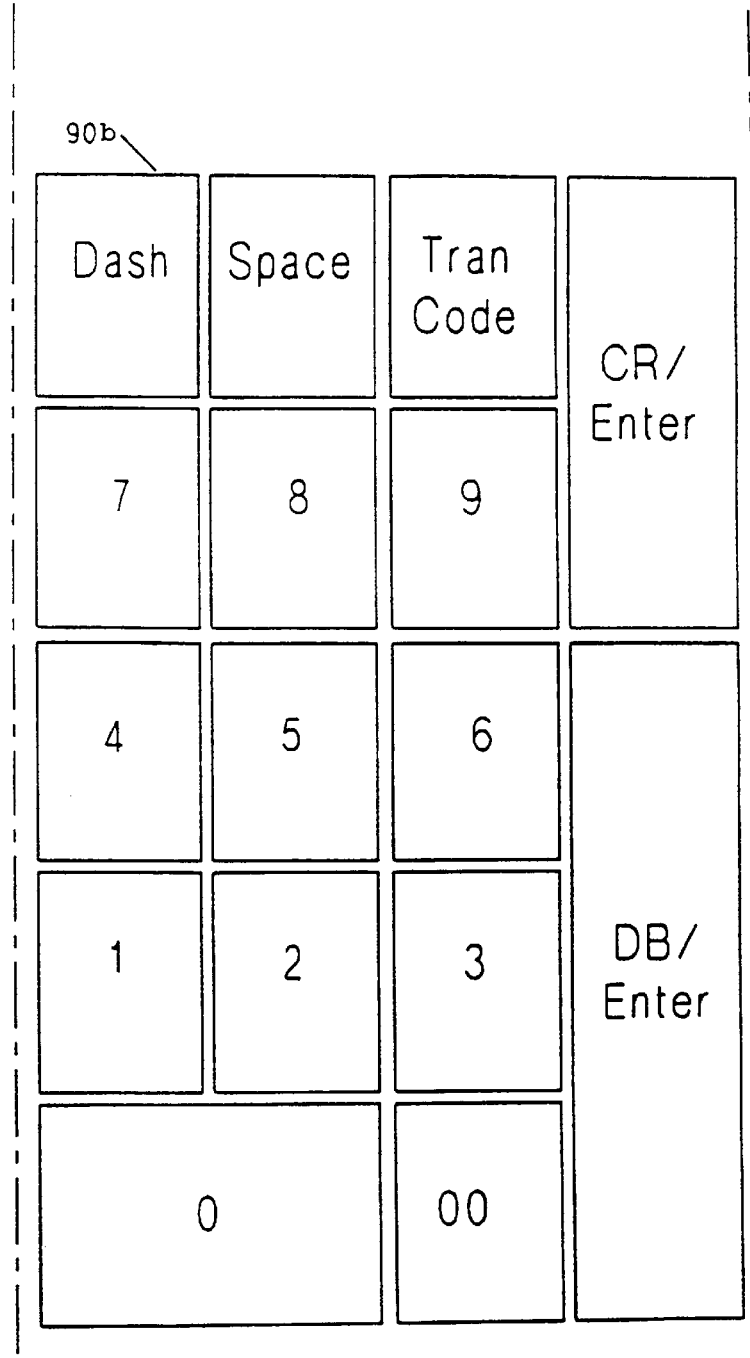

FIG. 18B

Backward Window
ACTIVATES THE WINDOW THAT PRECEDES THE ONE THAT IS CURRENTLY ACTIVE.

Forward Window
ACTIVATES THE WINDOW THAT FOLLOWS THE ONE THAT IS CURRENTLY ACTIVE.

Backward Field
ACTIVATES THE FIELD THAT PRECEDES THE ONE THAT IS CURRENTLY ACTIVE.

Forward Field
ACTIVATES THE FIELD THAT FOLLOWS THE ONE THAT IS CURRENTLY ACTIVE.

Insert Item
ENABLES YOU TO KEY IN THE CODE LINE OF AN ITEM TO BE ADDED TO THE CONTROL GROUP CURRENTLY BEING BALANCED.

Delete Item
REMOVES A SELECTED ITEM FROM THE CONTROL GROUP CURRENTLY BEING BALANCED.

Display Free Items
ENABLES YOU TO VIEW THE ITEMS AVAILABLE IN THE FREE ITEM STORE.

Get Free Item
RETRIEVES AN ITEM FROM THE FREE ITEM STORE AND PLACES IT INTO THE CONTROL GROUP CURRENTLY BEING BALANCED.

Make Free Item
REMOVES AN ITEM FROM THE CONTROL GROUP CURRENTLY BEING BALANCED AND PLACES IT INTO THE FREE ITEM STORE.

| Bkward Window | Forwrd Window |
|---|---|
| Bkward Field | Forwrd Field |
| Insert Item | Delete Item |
|  | Disply Free Items |
| Get Free Item | Make Free Item |

FIG. 18C

CUSTOMER CORRECTION

BANK NAME     ACCOUNT NUMBER     BRANCH NUMBER

YOUR DEPOSIT OF 02/02/88 TOTALLING $686.30 CONTAINED AN ERROR. CHECK #3 FOR $235.00 WAS INCORRECTLY LISTED AS $245.00.

YOUR ACCOUNT HAS BEEN DEBITED $10.00. PLEASE ADJUST YOUR RECORDS ACCORDINGLY.

| CHECKS | $ | ¢ |
|---|---|---|
| 1 | 78 | 80 |
| 2 | 134 | 00 |
| 3 | 245 | 00 |
| 4 | 58 | 00 |
| 5 | 125 | 00 |
| 6 | 45 | 50 |
| 7 | | |
| 8 | | |
| 9 | | |
| 10 | | |
| 11 | | |
| 12 | | |
| 13 | | |
| 14 | | |
| 15 | | |
| 16 | | |
| TOTAL | 686 | 30 |

 WILLIAM J. PROCUNIER     No. 1176

XXXX XXXX XXX XXXX
XXX XXXX XXXXX XXXX
XXXX XXX XXXXXX XX 9-10    19 87

PAY TO *Public Service & Gas*   $235 00
*Two hundred Thirty-five & 00/100* DOLLARS

FIRST BANK WESTERN

FOR *Void*     *William J Procunier*

⑆092900228⑆ ⑈584461201⑈ 1176

James C. Morrison
1765 Sheridan Dr.
Your City, USA 60618

FIG. 20

METHOD FOR IDENTIFYING SUSPECT ITEMS IN AN OUT-OF-BALANCE TRANSACTION

This is a continuation of application Ser. No. 07/956,923 filed on Oct. 2, 1992, now abandoned.

CROSS REFERENCE TO CO-PENDING APPLICATIONS

The present application is related to the following U.S. Patent Applications:

1) Ser. No. 07/419,568, entitled "Image-Based Document Processing System", and filed Oct. 10, 1989, now abandoned;
2) Ser. No. 07/600,777, entitled "Enhanced Automatic Data Reading", and filed Oct. 19, 1990, now U.S. Pat. No. 5,488,671;
3) Ser. No. 07/709,533, entitled "Means and Methods for Selectively Storing Images and Related Data Relevant to Automatic Data Reading Errors in a Document Processing System", and filed Jun. 3, 1991, now abandoned; and
4) Ser. No. 07/934,821, entitled "Method for Identifying and Tracking Document Characteristics in a Document Image Processing System," filed Aug. 24, 1992, now U.S. Pat. No. 5,359,667.

All of the above named U.S. Patent Applications are assigned to the assignee of the present invention and are incorporated herein by reference.

BACKGROUND

This invention relates to computerized document image processing systems in which data is automatically read from one or more images, and more particularly, to identifying which datum is the most likely source of error in the event that the automatically read data cannot be reconciled.

Document image processing systems have proven themselves as an efficient means for handling the ever increasing mountain of paperwork confronting businesses today. It is well known that image processing systems optically scan a document and form a digitized image. The document image is then electronically stored and made available to the workers responsible for processing whatever information the document holds.

Two particular benefits are realized when using a document image processing system. First, by electronically processing a document, the shuffling of documents between workers can be accomplished by routing the image to workers' workstations via local area networks. This saves the expense of having to manually transfer documents from worker to worker, thereby reducing the labor necessary to process a document.

The second advantage is that multiple workers can process an image concurrently if the image is made available at each worker's workstation. Concurrent processing of a document would foreseeably increase the overall throughput rate for the document processing staff.

One of the many areas where document image processing has proven successful is in the processing of checks done by banks and other institutions. Generally, early check image processing systems first formed a digitized image by optically scanning the document, then routed the check image to an operator workstation. The operator, working from the check image, provided data entry to the system processing the checks. The overall check processing system then accordingly adjusted the appropriate accounts based on the data entered by the operator.

More recent check image processing systems have improved upon the early systems by providing the capability to automatically read the courtesy amount from a check. The newer systems first locate the courtesy amount on the check image, and then employ character recognition techniques to determine the amount of the check. Thus, for each amount that can be automatically recognized, manual entry of the check amount is unnecessary, and the benefits of a greater throughput rate and a reduction in labor expenses can be realized.

As good as the latest check image processing systems are, problems still arise which require human intervention. In particular, character recognition techniques employed by today's courtesy amount readers are not infallible. Sometimes the character reader is unable to identify a handwritten character, other times the character reader may incorrectly identify a character. Both cases require human intervention: either to enter the data from the courtesy amount shown on the check, or to correct the amount misidentified by the character reader.

In addition to character recognition errors, there may be other sources of errors where a check image processing system processes deposit transactions. A deposit transaction usually includes a deposit ticket enumerating the checks to be deposited along with a total of the amounts indicated on the checks, and the checks to be deposited. The checks and deposit ticket are typically referred to as "items" in the transaction. Where the deposit amount is different from the total of the checks recognized by the system, the transaction is said to be out-of-balance. The out-of-balance condition may be caused by an addition error made by the depositor, a check which is missing from the transaction, or a misrecognized amount. If the deposit includes a large number of checks, identifying the source of the error may prove especially difficult and time consuming.

For out-of-balance transactions, there are at least three possible courses of action. First, the system could force an operator to manually rekey the courtesy amount for each check image; second, the system could attempt to automatically balance the transaction; or third, the system could present the all the information involved in the transaction to a balancing operator for further analysis.

Where an election is made to have an operator rekey the courtesy amount for each check, each check image is presented to the operator and the courtesy amount for that check is manually entered. The system then checks to see if the amount rekeyed brings the transaction into balance. If the transaction balances with the new amount, then further manual entry of data for the remaining check images is unnecessary.

If the system has an automatic balancing feature, the entire transaction may be presented to an automatic balancer in an attempt to balance the transaction without operator intervention. The automatic balancer may employ expert system techniques and be driven by information associated with the transaction.

The third way to balance the transaction is to present all the information surrounding a transaction to a balancing operator in hopes that the balancing operator will be able to recognize the check or deposit amount which is causing the unbalanced transaction. The check images, the deposit ticket, the recognized check amounts, and the calculated debit and credit totals are available for viewing by the balancing operator.

It will be recognized that the major difficulty in balancing an out-of-balance transaction is identifying the source of the error. This may prove especially difficult if there are a large number of checks involved in the deposit transaction. Thus, it is desirable to identify for the operator those checks which are the most likely source of the error in hopes that the item in error can be identified more quickly and the transaction processing completed sooner. The following patents discuss various ways in which the foregoing problem has been addressed U.S. Pat. No. 5,040,226, entitled "Courtesy Amount Read and Transaction Balancing System", awarded to Elischer et al., discloses one technique for assisting in identification of the source of error in an out-of-balance transaction. The numeric fields in the courtesy amount "are subjected to character recognition analysis, and a confidence level is associated with each such numeric field reflecting the degree of confidence with which the apparatus has recognized the numeric dollar amounts." An overall confidence level is calculated for the courtesy amount based on the respective confidence levels for each numeric field in the courtesy amount. '226 suggests multiplying the respective numeric confidence levels to obtain the overall confidence level. Once the overall confidence level is calculated for the courtesy amount on each check image, courtesy amounts can be presented to a balancer in the order of lowest to highest overall confidence level. The system of '226 discloses determining an overall confidence level for a courtesy amount based on the confidence of each individual numeric character recognized by the character reader and using this as a basis for balancing the transaction.

U.S. Pat. No. 5,040,227, entitled "Image Balancing System and Method" and awarded to Lyke et al., discusses a method which "allows a balancing clerk or operator to efficiently find and correct various errors in deposits which are out-of-balance." In contrast to '226, '227 discusses highlighting documents having a probability of error meeting a "certain threshold." Similar to '226, '227 bases is probability calculation for each document on the level of certainty with which the character recognition apparatus was able to identify each character making up the courtesy amount.

Both '226 and '227 calculate the overall confidence level for a figure read from a document image based only upon the individual confidence levels for each of the characters recognized by the automatic reader. While this method is certainly more useful than giving no indication as to the item which may be suspect, in many instances the overall confidence level for a particular item may not be a reliable indicator that the item is the source of the out-of-balance condition.

For instance, if a first item in a transaction has three digits, each of which is recognized with a respective confidence level of 0.9, 0.7, and 0.9, the overall confidence level as computed by the method discussed above would be (0.9*0.7*0.9)=0.567. If a second item in the transaction has six digits, each of which is recognized with the respective confidence levels 0.9, 0.9, 0.9, 0.9, 0.9, and 0.9, the overall confidence level for the second item would be (0.9*0.9*0.9*0.9*0.9*0.9)=0.530541. Since 0.530541 is less than 0.567, the second item would be presented to the balancing operator before the first item, according to '226. Clearly, this is not the most desirable order because the first item has a digit with a lower confidence level (the digit with a 0.7 confidence level) than any of the digits in the second item. It would be more desirable to present the first item to the balancing operator first in light of the digit with the lowest confidence level.

Using '227's approach, the confidence level for each item would have to fall below a predetermined threshold before the item would be displayed to the balancing operator first. If the chosen threshold falls between 0.567 and 0.530541, say 0.55, the item with the confidence level of 0.567 would not be highlighted as a suspect item, even though it has a digit that was recognized with a lesser confidence level than any of those digits in the second item.

In following either the approach suggested in '226 or '227, the desired result is less than optimal. There may be many more instances where items which are not the source of the out-of-balance condition are presented to the balancing operator before the item which is actually the source of the error. This may be more common in transactions which includes hundreds of items. Therefore, the methods suggested above may not be useful in increasing the overall throughput of the check image processing system.

An alternative approach to presenting transaction items to a balancing operator is briefly discussed in U.S. Pat. No. 5,120,944, entitled, "Image-Based Document Processing System Providing Enhanced Workstation Balancing," and awarded to Kern et al. '944 discusses making a determination as to whether there are suspect items that could be causing the out-of-balance condition, such as character transpositions, shifted digits, missing digits, etc. After the suspect items are identified, the suspect items are presented to the balancing operator ahead of the non-suspect items. The balancing operator can then focus on the suspect items first in order to determine which items may be causing the out-of-balance condition.

While the approach suggested by '944, similar to '226 and '227, is certainly better than not providing a balancing operator with any indication as to which item in the transaction may be the cause of the out-of-balance condition, '944's approach is likely to possess drawbacks which are similar to the limitations identified for '226 and '227. In particular, if a transaction includes a large number of items, there is a possibility that there will be multiple suspect items according to the criteria suggested by '944. If the number of suspect items becomes too large, the advantage of presenting the suspect items first soon evaporates due to the fact that each suspect item must be examined in turn to identify the item in error.

The present invention provides a method which is better suited to quickly identify the source of an error in an out-of-balance transaction so that the balancing task can be completed more efficiently.

OBJECTS AND SUMMARY OF THE INVENTION

Objects

It is therefore an object of the present invention to quickly direct a balancing operator to an item in an out-of-balance transaction which is the cause of the out-of-balance condition.

It is a further object to prioritize items such that the item most likely to be the source of error is first in the order and the item least likely to be the source of error is last in the order.

Summary

In a preferred embodiment of the present invention, each item in a transaction is examined for characteristics which would indicate that the item is the source of the error. Based upon the detected characteristics, the items are presented to the balancing operator in the order of most likely to least likely to be the source of the error.

A table of characteristics is maintained, wherein each characteristic in the table is indicative that an item possessing the characteristic is likely to be the source of the error. Often times, when an item exhibits a certain characteristic, it is more likely that the item is the source error than another item exhibiting a different characteristic. Each characteristic in the table is assigned a weight, wherein the weight is in proportion to the likelihood that an item exhibiting the characteristic is the source of error.

When a set of items in an out-of-balance transaction needs to be examined to determine which item in the set is the source of an error, each item is examined to determine which characteristics the item possesses. Based upon an item's characteristics and the weight associated with the characteristics, a priority value is calculated for each item.

Finally, the items are presented for inspection in priority order; that is, the item most likely to be the source of the error is presented first, and the item least likely to be the source of the error is presented last.

It should be understood that while the background and summary of the invention are presented in terms of check image processing systems, those skilled in the art will recognize that the present invention could be generally applied in other contexts where a plurality of suspect data are presented to a processing means and the processing means must identify one of the suspects as the actual culprit.

The foregoing objective and summary will become apparent by considering the Drawings and the following detailed description of the preferred embodiment of the invention.

BRIEF DESCRIPTION OF THE DRAWINGS

FIG. 3 illustrates the front side of a typical check;

FIG. 4 illustrates the front side of a typical deposit ticket;

FIG. 15 illustrates an example of a multi-window screen display which may typically appear on a balancing Workstation;

FIG. 18 shows the lower keys and associated functions of the keyboard of FIG. 16;

FIG. 20 illustrates an example of a typical customer advice letter that may be prepared by an operator at a balancing Workstation;

DETAILED DESCRIPTION

Like numerals and characters refer to like elements throughout the figures of the drawings.

Figure 1:
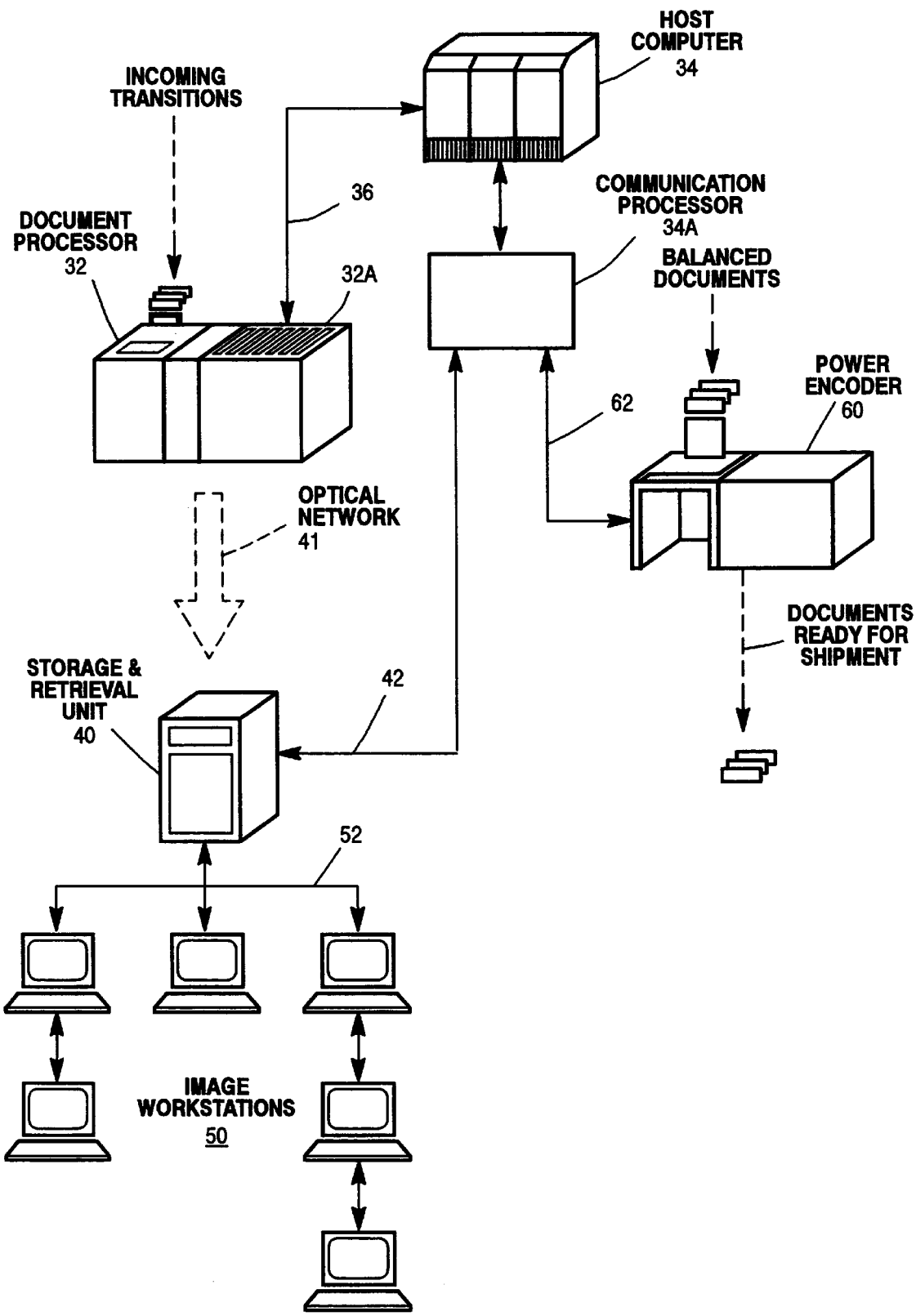
FIG. 1 generally illustrates an exemplary image-based bank check processing system in accordance with the invention.
Figure 2:
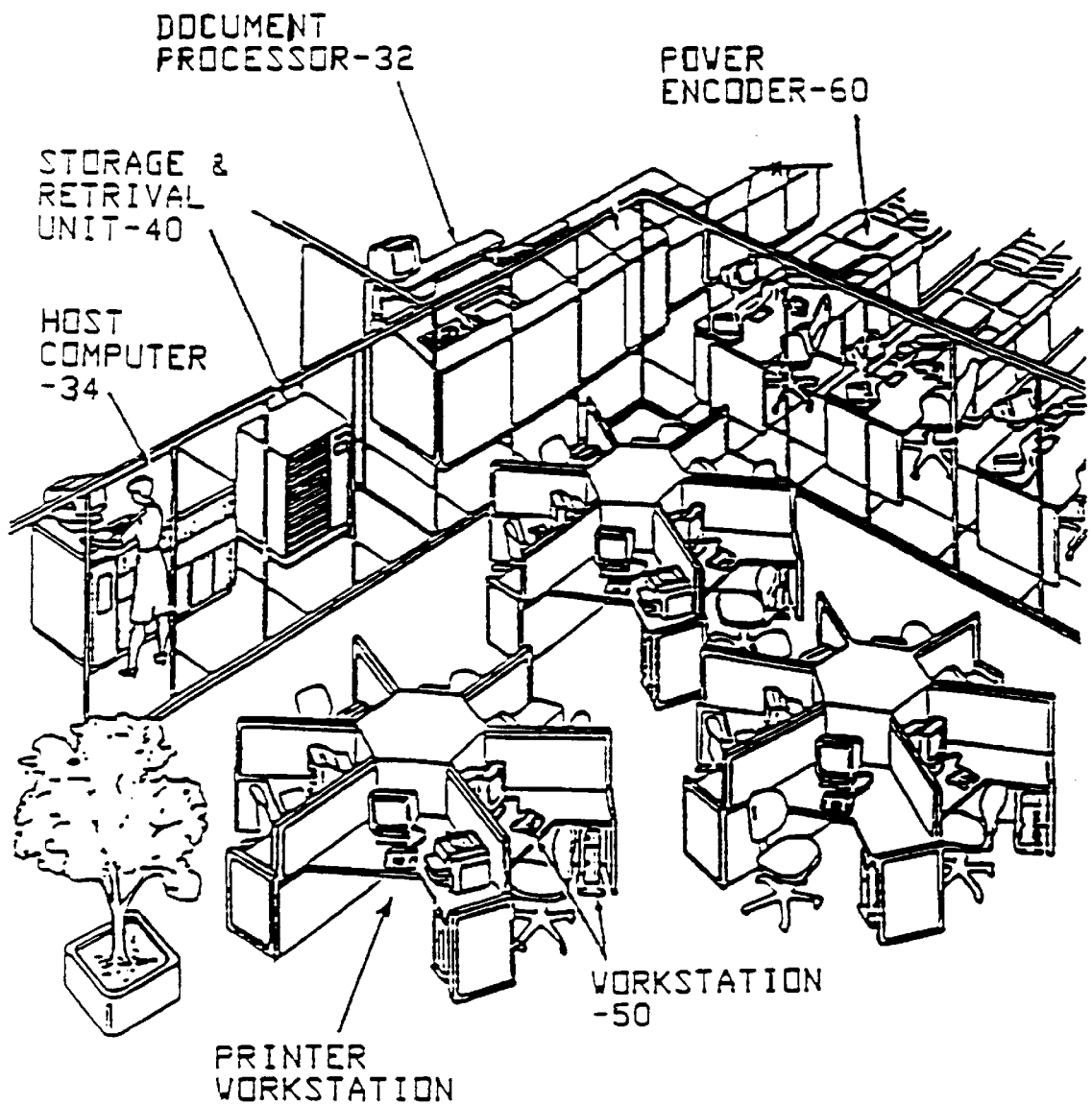
FIG. 2 is a pictorial representation of FIG. 1.

In order to demonstrate how the invention may be implemented and operated, an exemplary image-based bank check processing system, such as generally illustrated in FIG. 1, will first be considered. It is to be understood that this exemplary system is merely illustrative, and should not be considered as in any way limiting the scope of the invention, since the invention is applicable to other types of document processing systems, financial and otherwise.

The detailed description is organized as follows: first, a description of "Deposit Transactions" is provided; followed by a "General System Description" pertaining to the system in which the present invention is used; and finally, a description of "The Present Invention" is set forth.

I. Deposit Transactions

Initially, it will be helpful to consider the deposit type of transactions which this exemplary system will be assumed to process before discussing the system of FIG. 1.

As is well known, a very common activity within a bank involves the processing of deposits made by the bank's customers. A customer is typically one who has a checking account at the bank and, from time-to-time, makes a deposit for the purpose of depositing to his/her account one or more checks which the customer has received from others. These checks may be drawn on the same bank (on us checks) or on other banks. FIG. 3 illustrates the front side 10a of a typical check 10.

In order to make a deposit, a customer ordinarily fills out a deposit ticket listing the amount of each check to be deposited, and the total of all checks. FIG. 4 illustrates the front side 15a of a typical deposit ticket 15 listing for deposit only a single check for $250.00.

Figures 5, 7:
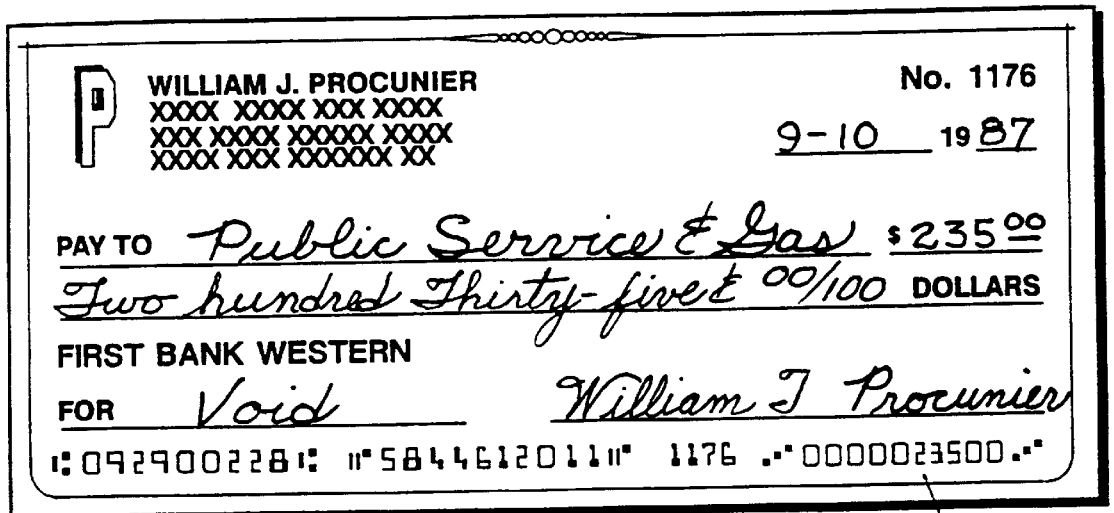
FIG. 5 illustrates the back side of a typical deposit ticket.
FIG. 7 illustrates a typical check containing an encoded amount below the signature.

If there are many checks to be deposited and insufficient space to list them on the front side 15a of the deposit ticket 15, the check amounts are then listed on the back side 15b of the deposit ticket 15, as illustrated in FIG. 5, with the total of these checks being written on the back 15a and also on the front side 15a of the deposit ticket 15.

Note that code lines 11 and 16 are provided at the bottom of the front sides 10a and 15a of both the check 10 and deposit ticket 15, respectively. These code lines 11 and 16 typically are both humanly-readable and machine-readable, and contain information which the bank uses for processing, such as the bank on which the document is drawn, a routing/transit number, the account number of the person who wrote or made out the check or deposit ticket, and a transaction code indicating the type of document. These code lines 11 and 16 are usually comprised of well known MICR (Magnetic Ink Character Recognition) data, but may alternatively be OCR (Optical Character Recognition) data. For convenience, it will be assumed for the remainder of this description that these code lines are MICR data.

Figure 6:
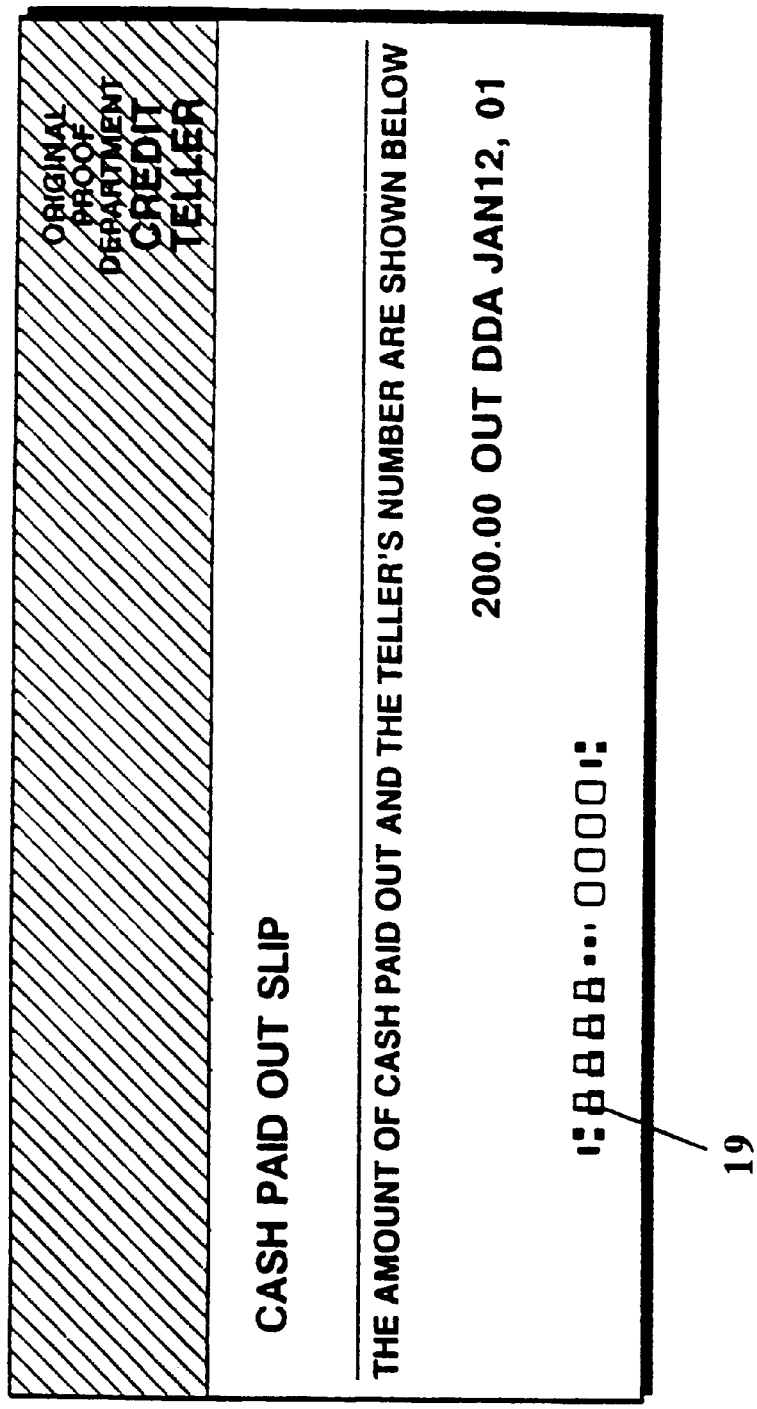
FIG. 6 illustrates a typical cash-paid-out slip.

A bank receives deposit tickets and associated checks for further processing from a variety of sources, such as from the bank's tellers, through-the-mail, from automated teller machines, etc. When the transaction is made at a teller window, the customer may also choose to receive a certain amount of cash, as indicated by the $200.00 amount provided on the "less cash received" line on the front side 15a of the deposit ticket 15 in FIG. 4. In such a case, the teller will then include with the check(s) and deposit ticket of the transaction, a cash paid out slip for the corresponding cash amount of $200.00, as illustrated in FIG. 6. This cash paid out slip also has a MICR code line 19.

Instead of receiving cash, the customer might wish to deposit cash into his account, in which case the customer would enter the appropriate amount into the "currency" and/or "coin" lines adjacent the "cash" block on the front side 15a of the deposit ticket 15 (FIG. 4). The teller would then include with the check(s) and deposit slip of the transaction, a cash paid in slip (not shown), which would be generally similar to the cash paid out slip shown in FIG. 6 (including an appropriate code line), except that it would designate cash paid in instead of cash paid out.

The deposit ticket 15 along with its associated checks 10, and any cash paid in or paid out slip constitute a transaction. Other documents, such as mortgage and credit card payments could also be included in a transaction. Assuming no errors have been made (by either the customer or the teller), the "net deposit" line on the front side 15a of the deposit ticket 15 should equal the algebraic sum of the associated check amounts and any cash paid in or paid out amount, and also the amounts of any other types of transaction items which may be included in the transaction. When this equality is present, the transaction is said to be "balanced."

It will be appreciated that a bank is required to process large quantities of transactions, such as described above, every working day. The bank needs to process these transactions for two primary purposes:

(1) To capture data from the transaction documents in order to be able to update the bank's own customer accounts. For example, a customer who made a deposit needs to have his account updated to reflect the results of the deposit, and (2) To send out checks drawn on other banks for collection. In accordance with current banking practices, it is required that a machine-readable amount be encoded on each check which for the present description will be assumed to be MICR data. This encoded amount is conventionally placed below the signature of the person who wrote the check, in line with the check code line 11, as illustrated at 21 in FIG. 7. It will be assumed that MICR encoding is used.

In accomplishing the above purposes, a check processing system provides for proofing, which in the banking industry refers to methods and apparatus for detecting, correcting and handling transaction balancing errors. It will be understood that such errors may be produced by the customer and/or teller, or may be introduced during processing.

II. General System Description

FIG. 1 illustrates an exemplary embodiment of an image-based bank check processing system.

An initial step of preparation is required to prepare incoming transactions for processing by the check processing system of FIG. 1. This preparation step involves removing staples, paper clips, rubber bands etc. from the transaction document, and arranging them in trays with proper orientation and in proper order, each tray corresponding to a block. Included in each tray is a block ticket for identifying the documents in that block, and pocket separators for separating the documents into block groups after they have been sorted into Pockets 32a. For the purposes of this description, and, by way of example, it will be assumed that a tray comprises a block of transactions containing about 3,000 documents, and without any transactions being split up between different blocks. To permit identification of the documents associated with each transaction, they are arranged in consecutive order in the tray. Typically, the deposit ticket of each transaction precedes the other documents of the transaction.

These tray blocks of transactions are brought to a high speed Document Processor 32 which includes an imaging capability, and also optically includes a microfilming capability and a capability for automatically reading the dollar amounts of the transaction documents. The operator places the tray block into an automatic document feeder of the Document Processor unit 32 and begins operation. The Document Processor 32 then reads the MICR code line on each document as the document flows through the unit, endorses audit trail information (including assigning a sequence number) on the document, optionally microfilms the document, and also captures an image of one or more sides of the document. If a document already has the dollar amount encoded, or if automatic dollar amount reading is available, this dollar amount is also read. The Document Processor 32 then sorts the documents (usually based on MICR data) to Pockets 32A using a sort pattern which may be downloaded from a Host Computer 34 via a communications processor 34a and a Communication Link 36. As will become evident hereinafter, it is advantageous to sort to Pockets 32A based on the destination indicated by the MICR code line in order to facilitate meeting destination shipment deadlines. As will also become evident hereinafter, it is additionally advantageous to permit a defective MICR code line to be sorted to its corresponding pocket, so long as the destination portion is readable. The manner in which such documents having defective MICR code lines, but with readable destinations are handled will be described later on herein. Documents which cannot be handled (e.g., because of a defective MICR line without readable destination) are sorted to a reject pocket for handling by conventional reject reentry procedures. If desired, deposit slips and cash-in and cash-out slips could also be sorted to separate pockets.

The data read from the transaction documents by the Document Processor 32 are fed to the Host Computer 34 via Communication Link 36, and typically includes each document's MICR data, amount data (if read), assigned sequence number and pocket location. The Host Computer 34 maintains a data base which stores the pertinent data corresponding to each transaction document being processed.

Images captured by the Document Processor 32 are processed, compressed, and formed into image packets. Each packet comprises one or more compressed images of a document along with an identifying header containing document identify in data (such as MICR data and sequence number). These image packets are then sent, via a high speed, point-to-point Optical Network 41 for storage on a high capacity disk-based magnetic Storage and Retrieval Unit 40. The Storage and Retrieval Unit 40 communicates with the computer 34 via Communication Link 42 and communication processor 34a.

Thus, after a tray block is passed through the Document Processor 32, the transaction documents will be in the Pockets 32A, corresponding document data, such as MICR, sequence number, dollar amount (if read) and pocket location will have been sent to the Host Computer 34 for storage in its document data base, and corresponding images with document identifying headers will have been stored on the Storage and Retrieval Unit 40.

Additional tray blocks are processed by the Document Processor 32 in the same manner as described above. In each pocket, the pocket tickets provided in the trays during the previously described preparation step serve to separate documents from different blocks. As pockets fill, an operator empties each pocket into a pocket tray which is identified with the corresponding pocket number. These pocket trays are moved to a holding area. When the system indicates that the documents in a particular pocket tray are ready for encoding, the tray may then be taken to a Power Encoder 60 for high speed encoding of the dollar amount on each check. FIG. 7 illustrates a check 10 having a MICR-Encoded Amount 21 below the check-maker's signature. Since, as mentioned previously, the sorting into pockets is advantageously based on shipping destination, these trays corresponding to destinations having the earliest deadlines, and which the system indicate are ready for encoding, can be encoded before those having later deadlines. In the system being described encoding of the dollar amount by a Power Encoder 60 is normally permitted only after the dollar amounts of all documents in a tray have been entered into the computer data base and, in addition, all corresponding transactions have been determined to be properly balanced. Batch and/or block balancing may additionally be provided as a further check on proofing accuracy.

Of course, before a transaction can be balanced, the dollar amounts of its documents must be entered into the computer data base. The images of those documents which still require dollar amount entry after being processed by the Document Processor 32 are sent by the Storage and Retrieval Unit 40, via a Local Area Network 52, to image Workstations 50.

As shown in FIG. 1, the illustrated system includes a plurality of image Workstations 50 which, in response to receiving images from the Storage and Retrieval Unit 40, serve as the primary operator interface for entering dollar amounts and correction data into the computer data base, and for balancing transactions. The Workstations 50 communicate with the Host Computer 34 via Network 52 and the Storage and Retrieval Unit 40. Accordingly, data generated at the Workstations 50 is sent to the Host Computer 34 by first sending the data, via network 52, to Storage and Retrieval Unit 40, which then sends the data, via Network 42 and Communication Processor 34A to the Host Computer 34.

As will be described in further detail hereinafter, the Workstations 50 are divided by function into various types: one type of Workstation is used to key in dollar amounts by viewing document images; a second type provides for the correction of MICR code lines, while also providing for amount entry if required; a third type is used to balance transactions; and a fourth type cooperates with a printer to provide text and image hard copy output.

It will be appreciated that proofing (transaction balancing) is required to correct any transaction errors which may be present (to the extent possible) before the checks are encoded by Power Encoder 60 and shipped to their proper destinations. The transaction documents sorted to the reject pocket by the Document Processor 32 also have to be entered into the computer data base, since they also belong to transactions which are to be balanced. These rejects are handled by a well known procedure known as reject reentry. The Power Encoder 60 may be operated in a reject reentry mode for entry of reject data into the computer data base.

When the transactions corresponding to the documents in a pocket tray which requires encoding have been determined to be balanced, the pocket tray may then be taken from the holding area to the Power Encoder 60, which communicates with the Host Computer 34 via Communication Link 62 and Communication Processor 34A. An operator places the documents from the tray into the input hopper of the Power Encoder 60 and initiates operation. As the documents pass through the Power Encoder 60, each pocket separator signals the Host Computer 34 to send to Power Encoder 60 the amount data for the sequence of checks which follows the pocket separator. The Power Encoder 60 then encodes the sequence of checks accordingly, using an appropriate printer (not shown). The Power Encoder 60 may also provide for further sorting of checks based on, for example, destination data contained in the MICR code line, or in response to sorting data derived from the Host Computer 34. The checks are thus made ready for shipment to their appropriate destinations. Any checks not fed to the Power Encoder 60, or those checks rejected thereby, are added to their respective group for shipping. The sorting may also be used to remove other types of transaction documents (such as pocket separators, deposit tickets and cash-in and -out slips) by sorting them to a separate pocket. Typically, a cash letter accompanies each shipped group indicating the number and amount of the checks in the group.

A. Description of Specific Features

Having generally described the exemplary check processing system of FIG. 1, various features of the system will next be considered.

1. Image Processing and Storing

In order to maintain a high rate of document processing, the Document Processor 32 provides for capturing, processing, and compressing images in real time matching the speed of document flow. The Optical Network 41 permits the resulting image packets to be sent to the Storage and Retrieval Unit 40 at a sufficiently fast rate such so that images are stored on unit 40 at the image capture rate. Thus, images are available for sending to the Workstations 50 a very short time after they have been captured by the data processor 32. Retrieval of images can occur one image at a time, or in groups of images defined by a list or range.

To further speed up storage and retrieval operations and increase image throughput, the Storage and Retrieval Unit 40 is designed to provide for the concurrent storage and retrieval of images, that is, storage and retrieval operations are performed in parallel. In addition, operation is such that once written, neither the image nor its header are ever changed (commonly referred to as write-once operation). When an application determines that a block of images is no longer needed (such as when it is determined that all transactions of the block are correctly in balance), the block may then be deleted from the Storage and Retrieval Unit 40. This temporary storage of images by the Storage and Retrieval Unit 40 keeps the unit 40 available for use in storing newly received images.

Figure 8:
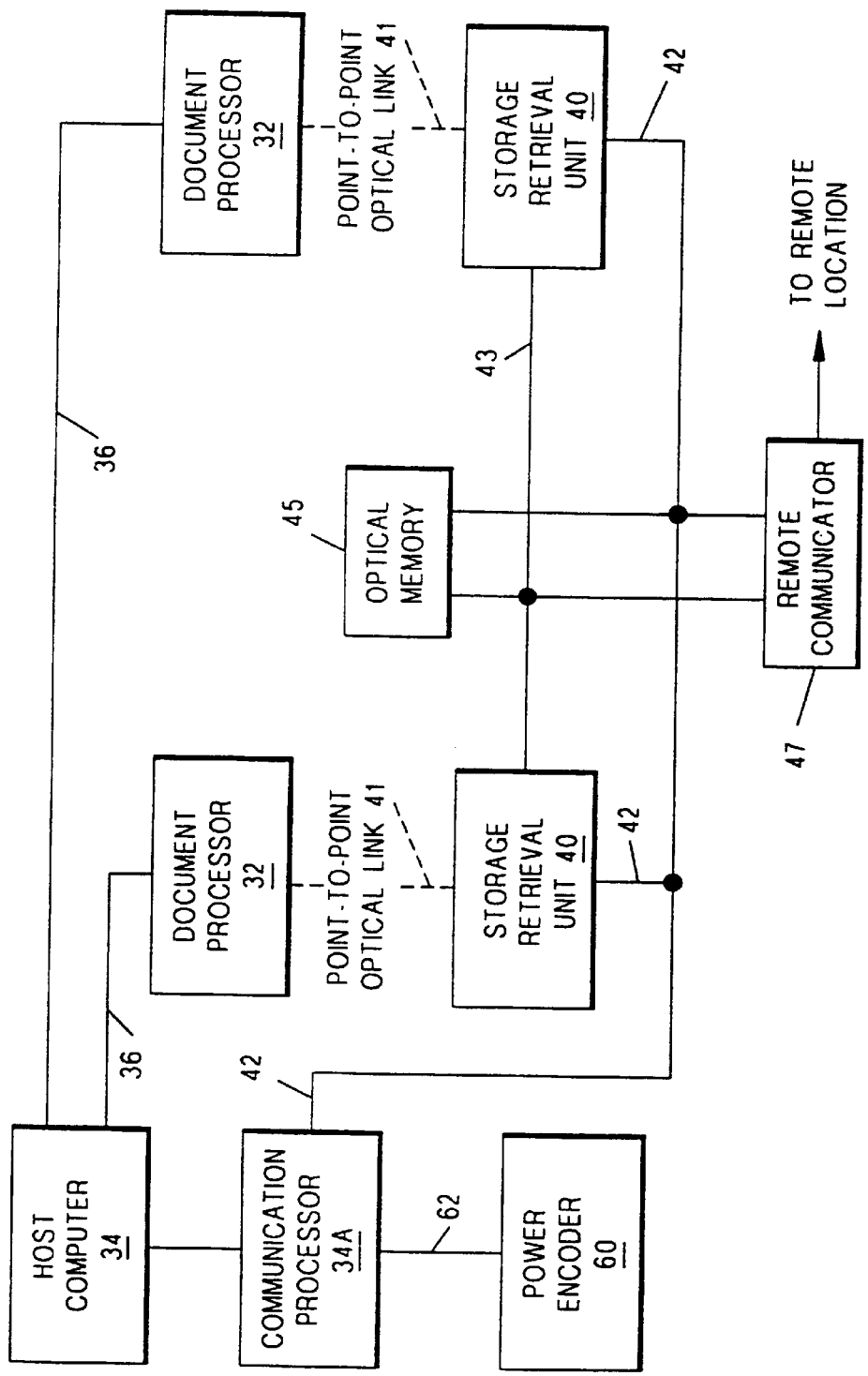
FIG. 8 is a block diagram illustrating how the system of FIG. 1 can be expanded.

FIG. 8 is a block diagram illustrating how the system of FIG. 1 can be expanded to provide a plurality of Storage and Retrieval Units 40, as well as a corresponding plurality of Document Processors 32. Note in particular, the provision of Communication Link 43 which provides for transmitting images between units 40. This advantageously permits a Workstation 50 to receive images from any Storage and Retrieval Unit 40 so that the total work load can be shared amongst all the available Workstations. FIG. 8 also illustrates how the Storage and Retrieval Units 40 may communicate, via Communication Links 42 and 43 with an Optical Memory 45 and a Remote Communicator 47. The Optical Memory 45 provides the capability for archiving images, and the remote communicator provides the capability of transmitting images to a remote location.

2. Host Computer Unit 34

The Host Computer 34 serves as the central control unit for the system of FIG. 1. It coordinates the functioning of the application software running in the system and directs data traffic. The size of the Host Computer 34 is minimized, since images are routed directly to the separate Storage and Retrieval Unit 40 and do not flow to the computer 34. This separation of the Storage and Retrieval Unit 40 form the computer 34 also provides the additional advantage of being able to use a high speed optical network, such as illustrated by Optical Network 41, to speed the flow of images from the Document Processor 32 to the Storage and Retrieval Unit 40. Furthermore, since images do not flow to the Host Computer unit 34, it may be located at a remote location without the need for the high bandwidth communications which would be required for image transmission.

3. Workstation Operations

Figure 9:
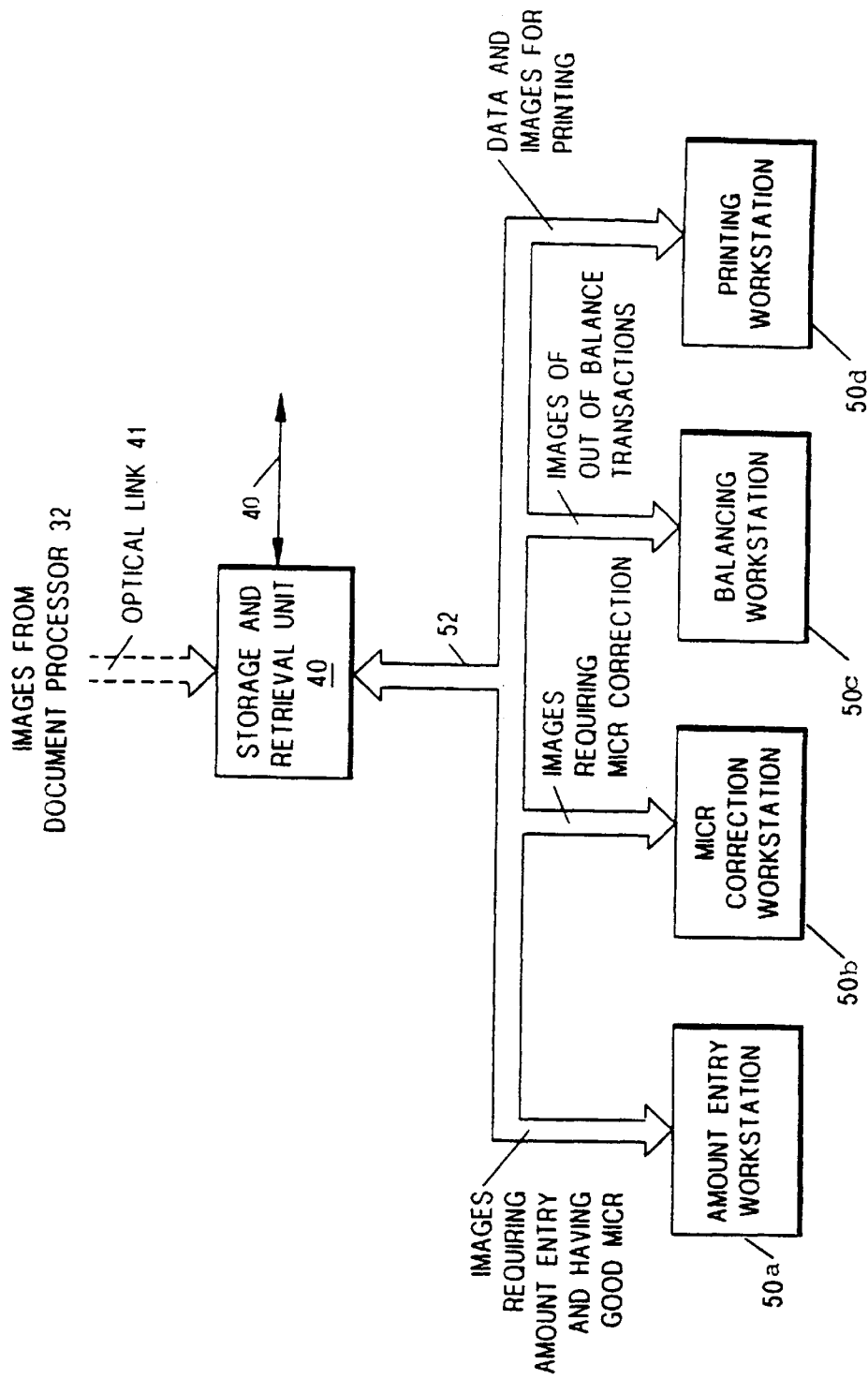
FIG. 9 is a block diagram illustrating various types of Workstations employed in the system of FIG. 1.

As shown in FIG. 9, the Workstations 50 include four types of Workstations 50A, 50B, 50C and 50D. The system is designed so that an operator can input priority data into the Host Computer 34 for controlling the order of transmission of transaction documents to these Workstations. For example, operation can be prioritized such that those transactions having documents with earlier shipment deadlines will be sent to the Workstations 50 earlier than those having later deadlines.

With reference to FIG. 9, the Workstation 50A, 50B, 50C and 50D are dedicated as follows: each Workstation 50A is an amount entry Workstation and receives images of those documents requiring amount entry and having good MICR code lines; each Workstation 50B is a MICR correction Workstation and receives images of documents having deficient, but acceptable MICR code lines; each Workstation 50C is a balancing Workstation and receives images of out-of-balance transactions for the purpose of balancing them with operator assistance; and Workstation 50D is a printing Workstation which provides for printing text and graphics.

The above described Workstation dedications permit processing operations to be overlapped. For example, transaction balancing can be performed by Workstation 50C on transactions which are ready for balancing (such as those involving high priority documents), while Workstation 50A is entering amounts, while Workstation 50B is correcting code lines as well as entering amounts, and while Workstation 50D is providing printing. As mentioned previously, in connection with FIG. 1, data entered at Workstations 50A, 50B and 50C is sent via Communication Link 52, Storage and Retrieval Unit 40 and Communication Link 43 to Host Computer 34 for storage in the computer's data base.

Figure 10:
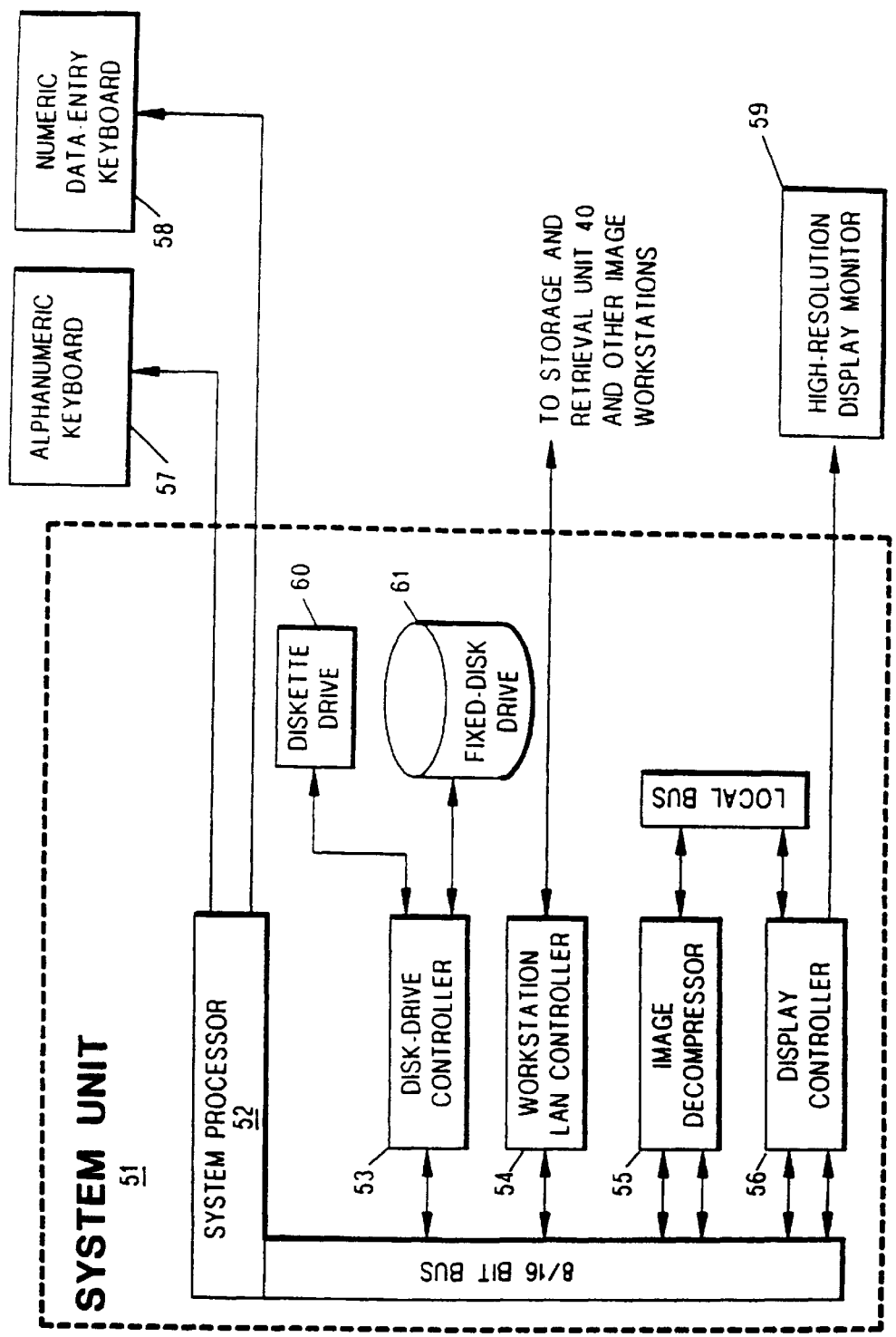
FIG. 10 illustrates preferred hardware for the image Workstations of FIG. 9.

The Workstations may, for example, be personal computers providing the described functions described herein. Since images are stored in compressed form on the Storage and Retrieval Unit 40, as described previously, each Workstation also provides for decompressing received compressed images for display on the Workstation monitor. An operator can also zoom, pan, scroll, rotate and flip (view the rear) an image for optimal viewing. The block diagram of FIG. 10 illustrates a preferred hardware architecture for the image Workstations the components of which are described below:

System Unit 51 Houses the system processor 52, power supply, cooling fan, I/O bus, two serial ports, a parallel interface, and expansion card slots (e.g., for expansion memory).

System Processor 52 Contains the microprocessor, memory, and the interface for the keyboards. It also provides socket access to the I/O bus.

Disk-drive Controller 53 Provides the interface for the Diskette drive 60 and the fixed-disk drive 61.

Workstation LAN (Local Area Buffers image packets sent Network) Controller 54 from the Storage and Retrieval Unit 40 (FIG. 1) before they are displayed on the monitor 61 executes the communications protocol between the image Workstation and the Storage and Retrieval Unit.

Image Decompressor 55 Decompresses images (i.e., reverses the compression process that took place in the Document Processor 32).

Display Controller 56 Generates graphics, manages display memory, defines the screen size, and enables document image manipulation for the high-resolution display monitor 59.

Alphanumeric Keyboard (optional) 57 Enables operators to perform form basic text processing.

Data-entry and Function Keyboard Supports high-speed data entry entry tasks and provides various function controls.

High-resolution Display Monitor 59 Displays images in four gray levels.

Diskette drive 60 Enables the operator to perform read and write operations on a 3½-inch floppy disk.

Fixed-disk Drive 61 Provides high storage capacity at the Workstation.

It is to be noted that a print Workstation 50D is based on the same Workstation hardware illustrated in FIG. 10 with the addition of a printer interface and a printer.

The operations of each of the above described types of Workstations in the exemplary system being described will next be considered in further detail.

4. Amount Entry Workstations 50A

The operations at data entry Workstation 50A are dedicated to keying in the dollar amount seen on each document image. A transaction code identifying the type of document (e.g., debit or credit) may also be entered by the operator. As previously described in connection with FIG. 9, only those document images requiring amount entry and having good MICR code lines are sent to Workstation 50A.

Figure 11:
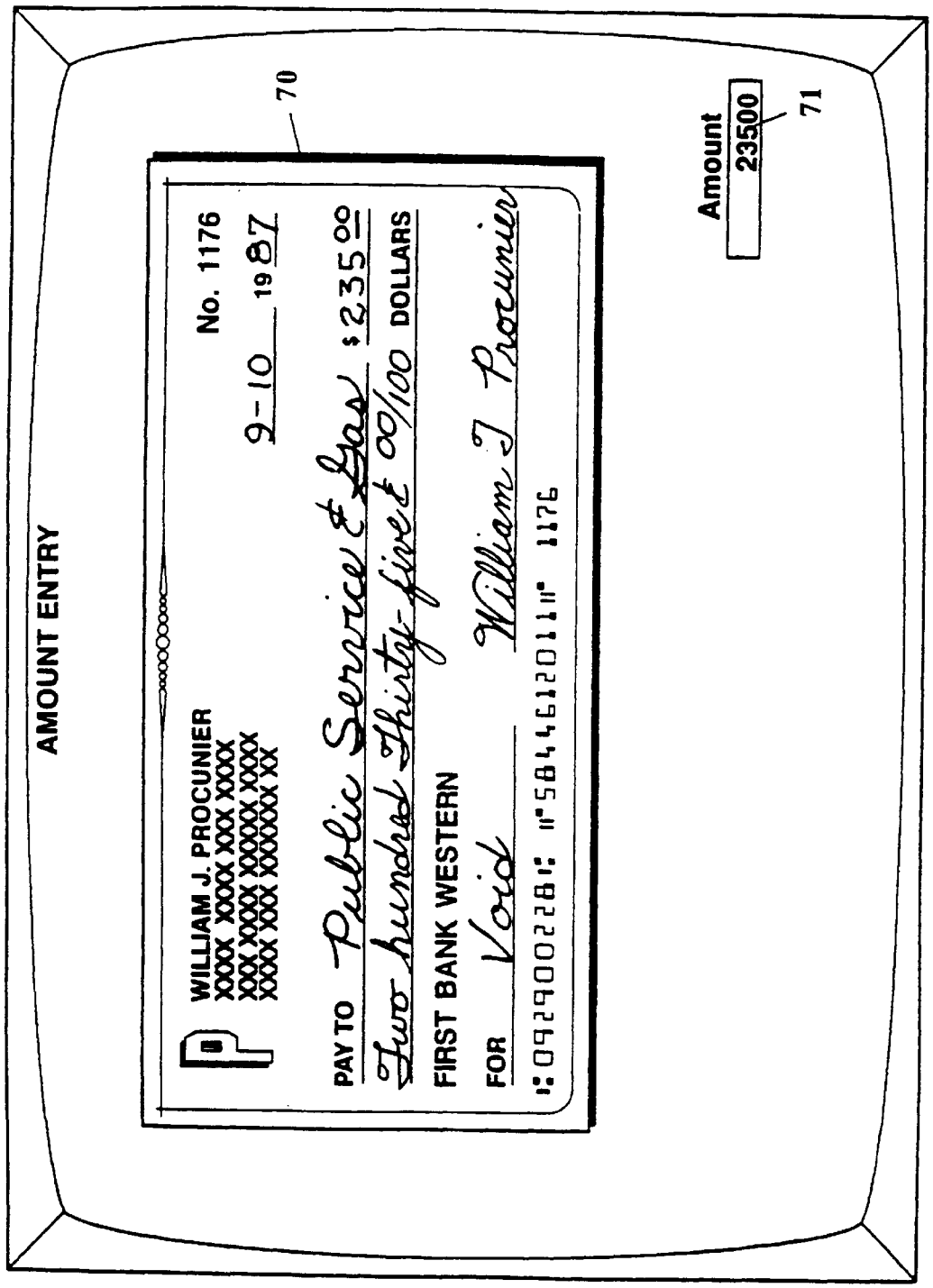
FIGS. 11 and 12 illustrate examples of image displays which may typically appear on an amount entry Workstation.

An example of an image display which may typically appear on an amount entry Workstation 50A is illustrated in FIG. 11. Note that the operator sees only an Image 70 of the document (which in FIG. 11 is a check) along with a box 71 (which is initially blank) labelled "Amount." In FIG. 11, box 71 contains the entry "23500" (decimal point omitted), which is the operator's entry of the observed $235.00 amount of the check. Operation is variably controllable such that the screen will automatically switch to the next document whose amount is to be entered after the operator has entered the first 2, 3, 4, etc. of the observed amount. If the operator cannot read the dollar amount on the document, he/she would merely press a "pass" key which would then cause the next document to be displayed.

Figure 12:
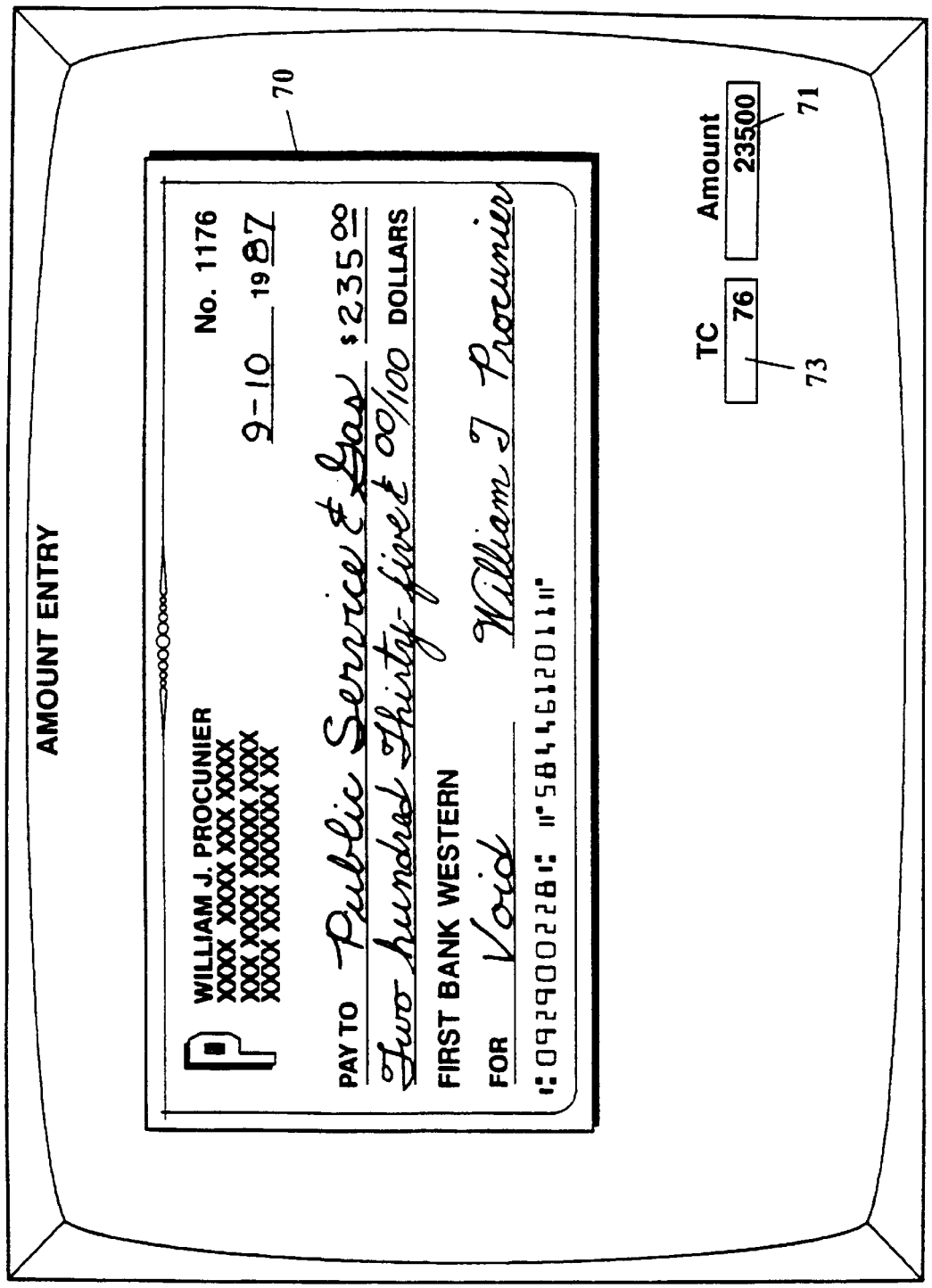

FIG. 12 illustrates an example of a display screen for an amount entry Workstation 50A, wherein a transaction code box 73 labelled "TC" is additionally displayed as a result of the operator having keyed in a transaction code indicative of the type of document. Workstation operators are trained to recognize the types of document (e.g., check, deposit ticket, etc.), and enter the correct transaction code (prior to entering the amount). In FIG. 12, it will be seen that the operator has entered the transaction code "76" in box 73 and the amount "23500" in box 71. To speed up operator processing, operation is caused to be such that transaction codes need not be entered for checks, since the system assumes that a check is indicated when no transaction code is entered.

Since most documents will be directed to an amount entry Workstation 50A operating as described above a very high document processing rate is achievable. Furthermore, processing speed is additionally enhanced since document images are applied to data entry Workstations 50A (and in a like manner to Workstations 50B) irrespective of what block they are from: in addition the sending of document images to Workstations 50A and 50B can advantageously be provided using priorities which may have been entered into the system, as described previously.

5. Amount Entry and MICR Correction Workstation 50B

As will be evident from FIG. 9, Workstation 50B is dedicated to receiving images of documents requiring MICR code line correction. These images are a result of the decision to sort documents to the Document Processor Pockets 32A (FIG. 1) based on the destination indicated in the MICR code line, even for documents having defective MICR code lines, so long as the destination MICR portion is readable. This results in a significant reduction in the number of rejects that require the use of reject reentry procedures, which are slow and labor intensive. In order to facilitate retrieval from the Storage and Retrieval Unit 40 (FIG. 1) of these document images requiring MICR correction, they are stored in a separate code correction file on the Storage and Retrieval Unit 40.

Figure 13:
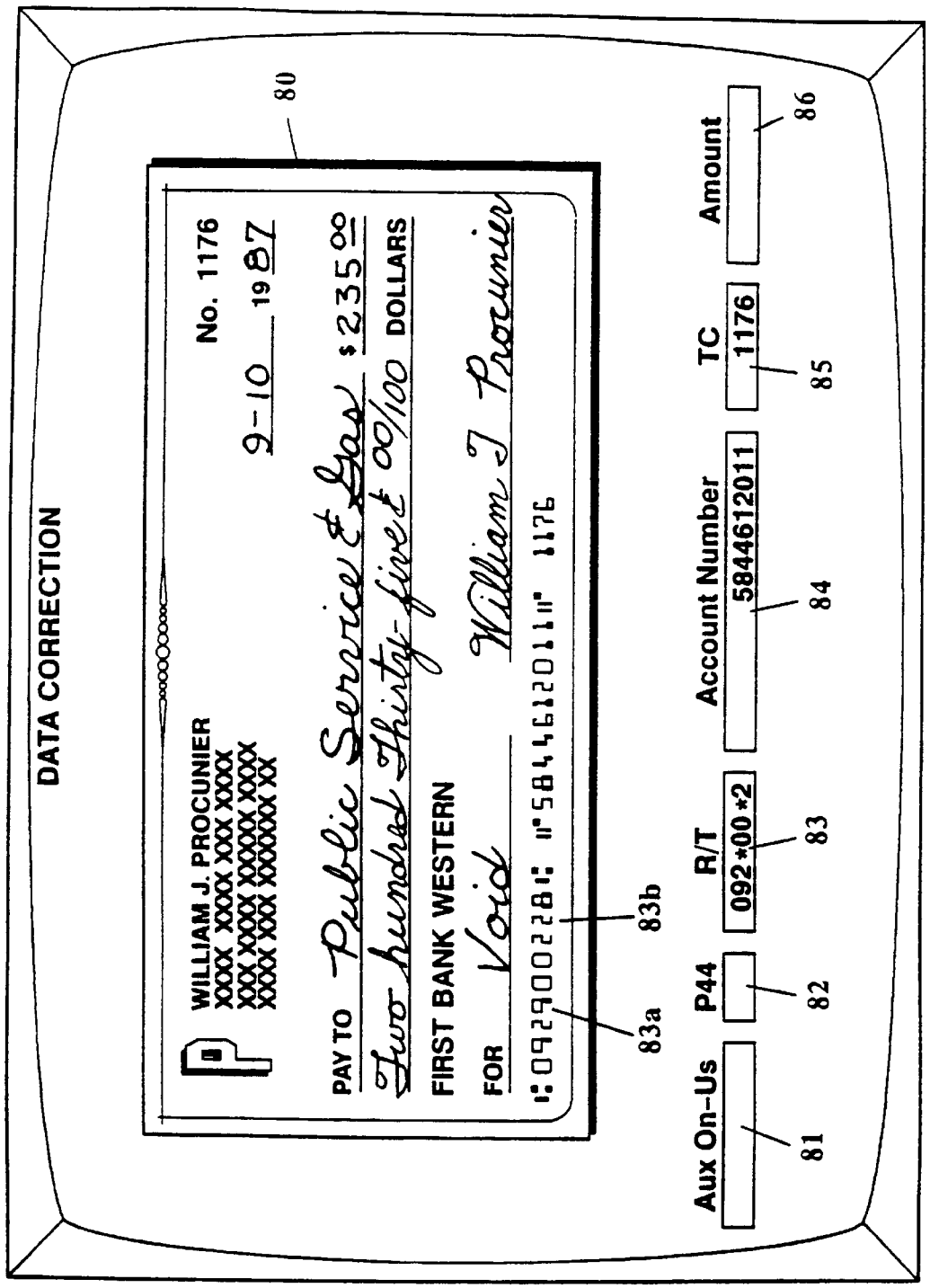
FIGS. 13 and 14 illustrate examples of screen displays which may typically appear on a MICR correction Workstation.

The manner in which the code correction Workstation 50B typically operates will be understood by reference to FIG. 13 which illustrates a screen display showing the image of a check 80 requiring MICR code line correction, along with a plurality of MICR code line boxes 81, 82, 83, 84, 85 and an amount entry box 86. When the display first appears on the screen, those portions of the MICR code lines which are known (box 84) appear in the appropriate boxes 81 to 85. Those which are not known are left blank. If known, the amount appears in box 86. If a box contains an entry which was only partially readable (box 83), an asterisk "*" appears to indicate each character or number, which needs entry.

In response to the display shown in FIG. 13, an operator would, view the displayed check image 80, and substitute "9" for the first asterisk in box 83, and "2" for the second asterisk in box 83. The operator would also provide entries for any blank boxes requiring entry, and then would be prompted to enter the check amount $235.00 (and transaction code if required). The display would then switch to a new document image.

Figure 14:
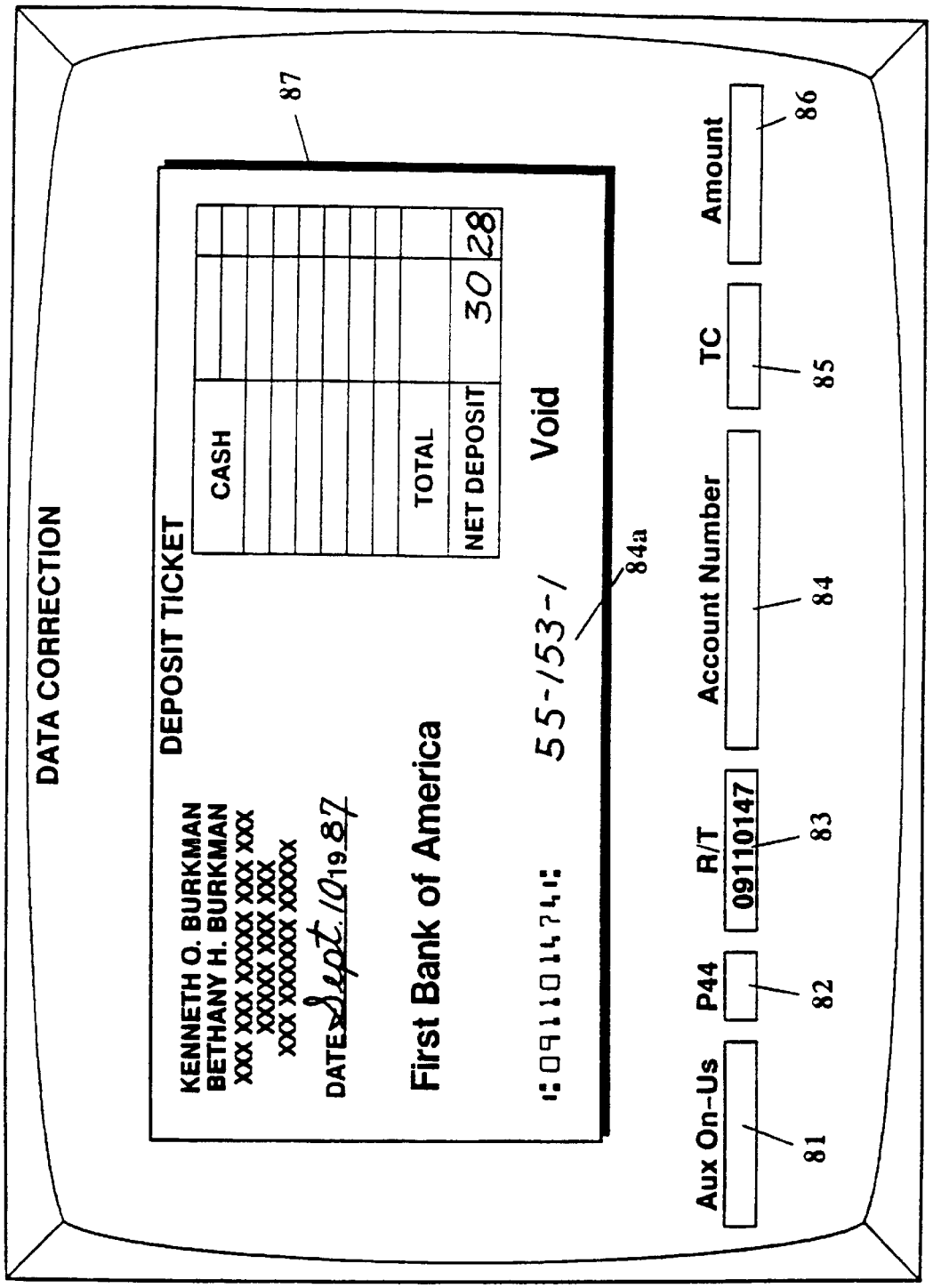

FIG. 14 illustrates a display by the code correction Workstation 50B of a deposit ticket 90 in which the account number is handwritten on the deposit ticket, usually by a teller to identify the account to which the deposit ticket applies. An operator may conveniently enter this handwritten account number in the appropriate box 84 by viewing the document image.

As described in connection with the amount entry Workstation 50A, an operator of a MICR correction Workstation 50B can depress a "pass" function key if a required entry cannot be read from the check image.

6. Balancing Workstation 50C

The balancing Workstation 50C receives transactions which do not balance for the purpose of attempting to get them into balance. The Workstation 50 is also typically used for balancing blocks and/or batches of transactions. An out-of-balance transaction may, for example, be a deposit transaction for which the total on the deposit ticket (FIG. 3) does not equal the sum of the checks being deposited. Of course, balancing will not be attempted for a transaction until it has had its MICR code corrected by Workstation 50B (if necessary), and has had its dollar amount entered or attempted to be entered (either automatically by Document Processor 32 in FIG. 1, or by imaging using Workstation 50A or 50B). The basic manner in which a balancing Workstation 50C provides for handling a transaction will next be considered.

Figure 15:
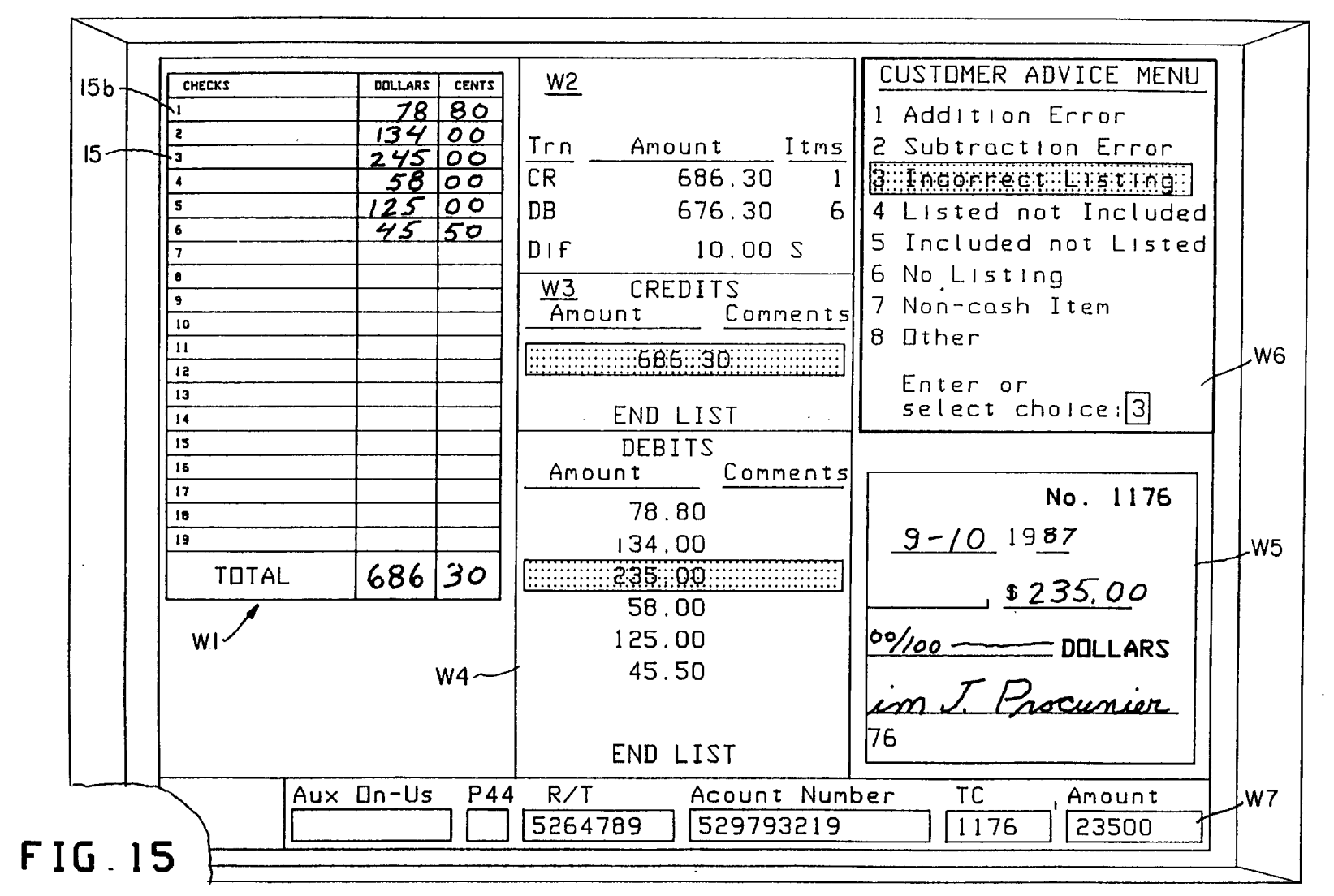
Figure 16:
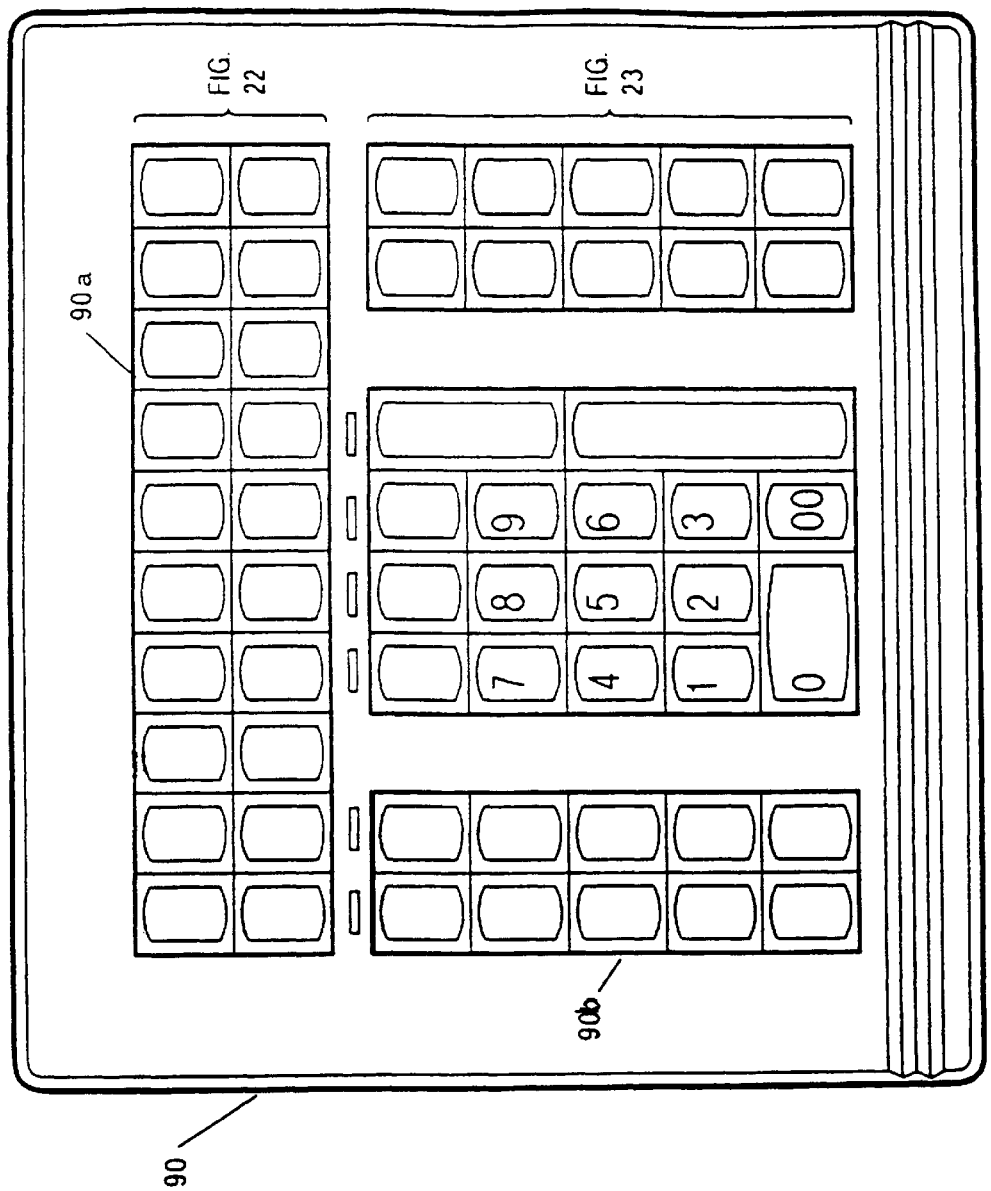
FIG. 16 illustrates a typical Workstation keyboard.
Figure 17B:
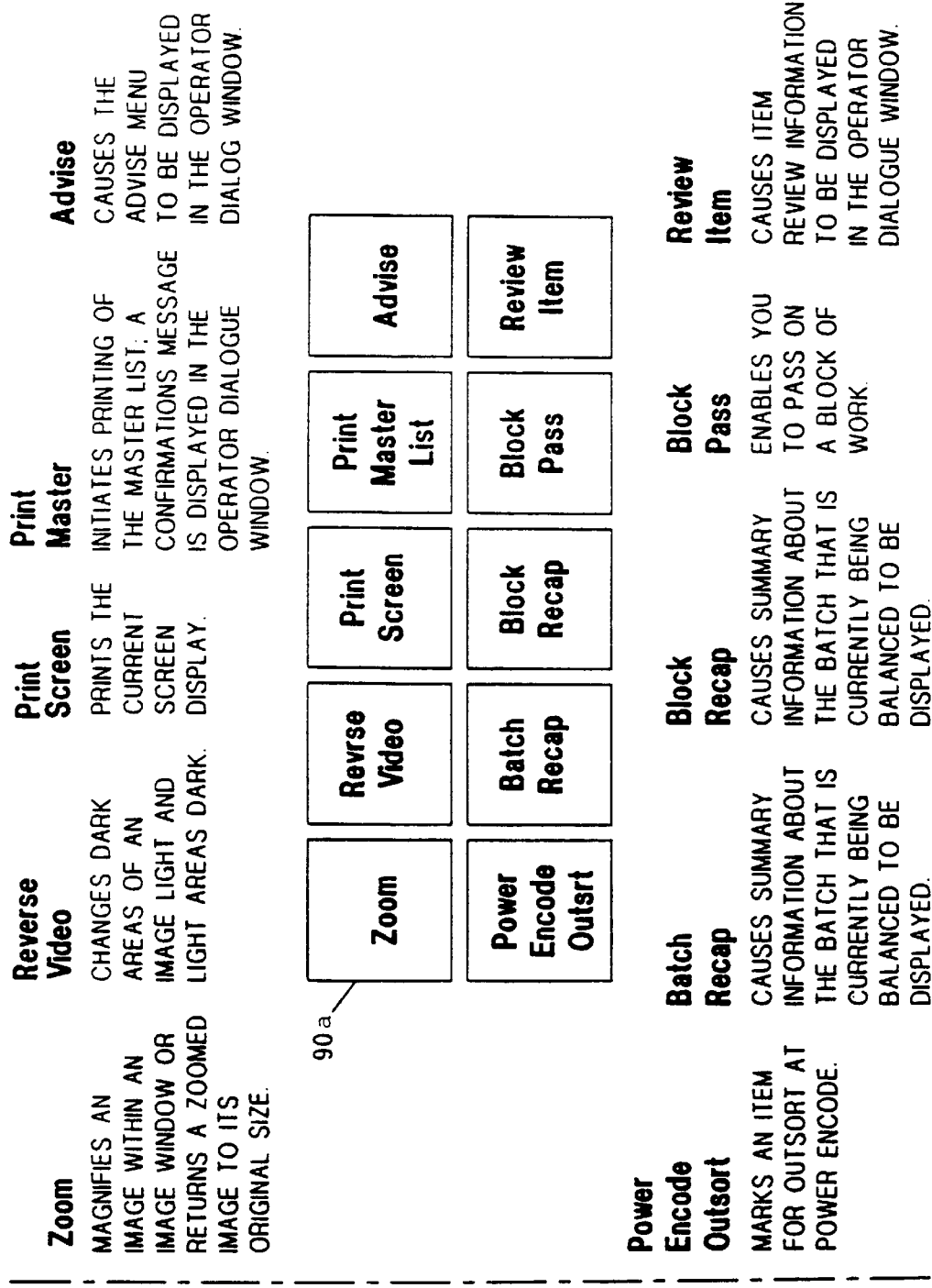
FIG. 17 shows the upper keys and associated functions of the keyboard of FIG. 16.

Workstation 50C is provided with a multi-window display (FIG. 15) controlled by a keyboard 90 (FIGS. 16–18). FIG. 16 illustrates the overall layout of the keyboard 90. FIG. 17 illustrates the upper portion 90a of the keyboard, and FIG. 18 illustrates the lower portion 90b of the keyboard. FIGS. 17 and 18 show the labels of the keys. Also included are short description describing the operation of particular keys. The number keys in the center of the lower keyboard portion 90b are for entering numbers.

Workstation 50C is provided with a multi-window display (FIG. 15) corresponding to a single transaction. It is to be understood that each window is controllable (flip, rotate, scroll, zoom, etc.) using the various window control keys of the keyboard (FIGS. 17 and 18). It is also to be understood that the particular multi-window display and keyboard shown are merely illustrative.

A first window W1 in FIG. 15 displays an image of a deposit ticket 15 indicating a total of $686.30. The other side may be seen by pressing the "Flip" key in the top row in FIG. 17.

A second window W2 in FIG. 15 provides a summary of the transaction derived from the database in Host Computer 34. The "CR" amount (686.30) in window W2 is the deposit ticket total, the "DB" amount (676.30) is the sum of the checks being deposited, and the "DIF" amount (10.00) is the difference between the "CR" and "DB" amounts, that is, the amount by which the transaction is out of balance. Note that window W2 also indicates the number of "CR" and "DR" items, 1 for "CR" (deposit ticket) and 6 for "CR" (checks). Movement between windows is accomplished by using the "Backward window" keys in FIG. 18.

A third window W3 in FIG. 15 labeled "CREDITS" lists each of the "CR" (deposit ticket) amounts. The deposit ticket 15 shown in window W1 is the only listing in window W3 since the displayed transaction has only one credit item.

A fourth window W4 in FIG. 15 labeled "DEBITS" lists each of the "DB" (check) amounts. Accordingly window W3 lists the amount of each of the six debits (checks) whose sum is equal to the total debit "DB" amount in window W2.

A fifth window W5 in FIG. 15 shows a partial image of the particular debit (check) whose amount is highlighted in window W4, which is the check for $235.00. The particular check which is highlighted can be changed by using the shift key in FIG. 17 with the up-or-down keys in FIG. 18. Manipulation of the check shown in window W5, such as scrolling, (to see other parts of the check), flipping, etc., is accomplished by appropriate use of particular keyboard keys (FIGS. 17 and 18). It will be understood that, if there were more credit items shown in the credit window W3, window W1 would display the particular credit item highlighted.

A sixth window W6 in FIG. 15 is a dialogue window which is used to permit an operator to dialogue with the computer such as by choosing a particular operation to be performed from a menu. As an example, window W6 illustrates a "CUSTOMER ADVICE MENU." Other types of dialogue activity can also be provided, as will become evident hereinafter.

A seventh window W7 in FIG. 15 at the bottom of the screen shows MICR code line data for a highlighted item in window W3 or W4, dependent upon which immediately preceding window was active. An active window has a thick black border, as illustrated for window W6 in FIG. 15. Movement between boxes (fields) in window W7 is accomplished using the "Backward Field" and "Forward Field" keys in FIG. 18.

The balancing Workstation 50C is programmed to automatically lead the operator through various steps for balancing out-of-balance transactions using the multi-window display capabilities described above. Operation pauses only when operator action is required. These steps are illustrated in FIG. 19 and described in further detail below.

Figure 19:
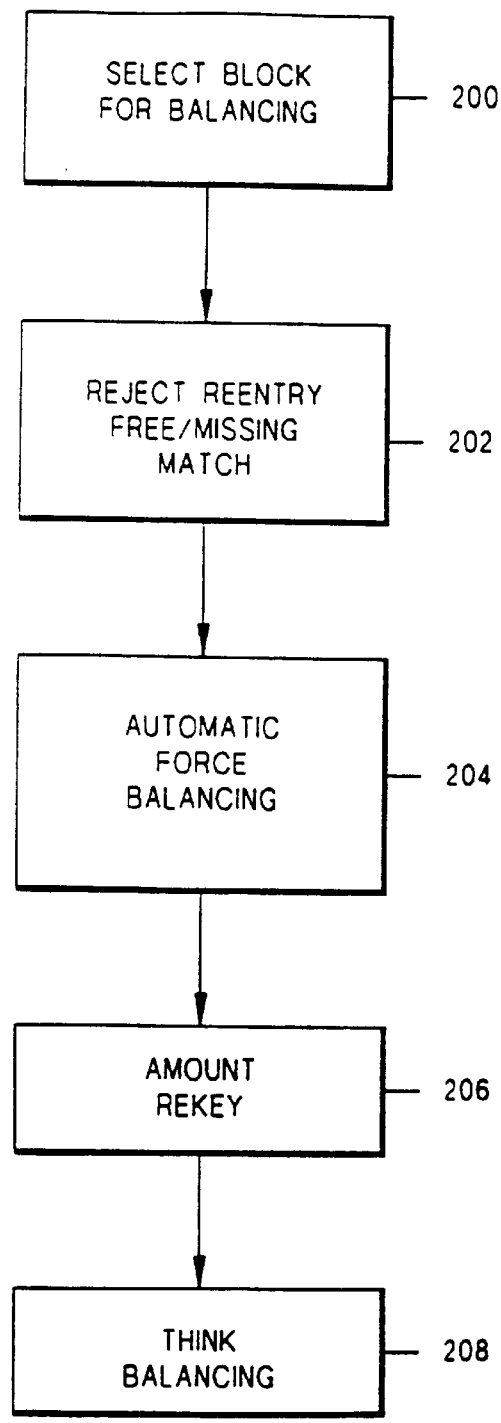
FIG. 19 is a flow chart illustrating the automatic steps through which a balancing Workstation leads an operator in order to balance out-of-balance transactions.

FIG. 19 is a flow chart illustrating the automatic steps through which a balancing Workstation leads an operator in order to balance out-of-balance transactions. The initial step is to select a block for balancing as indicated in Step 200.

At Step 202 the Host 34 (FIG. 1) sends to the Balancing Workstation 50C the free and missing items from reject reentry. These items are the documents which were entered using reject/reentry procedures, as described previously. Each out-of-balance transaction, is examined in turn to determine whether any items are missing from the transaction. If so, a determination is made as to whether any of the free items could be a possible match for any of the missing items. If a possible match is encountered, the image of the missing item and the code line for the free item are displayed to the balancing operator on the Workstation screen for verification. The operator simply answers "yes" or "no" to the matchup. Operation proceeds in this manner until all out-of-balance transactions have been handled, after which operation proceeds to the next step.

Automatic force balancing processing takes place at Step 204. During automatic force balancing each out-of-balance transaction is examined to determine if any are out-of-balance by less than a predetermined dollar amount specified by the user. If there are any transactions fitting this description, the transaction is automatically forced into balance without operator intervention. Operation then proceeds to the next step after all out-of-balance transactions have been handled. Any transactions which were balanced as a result of this step are removed from the list of out-of-balance transactions.

Step 206 provides that the amount for each item in the transaction is rekeyed to attempt to balance the transaction. The system specifies the maximum number of items in a transaction that will qualify the transaction for amount rekey. For each out-of-balance transaction which contains less than the number of items specified by the user, the transaction is presented to the balancing operator for rekey. During rekey, the items in the transaction are processed to determine if any are suspects for keying errors. These items are presented to the operator first, followed by all other items in the transaction. If an amount is keyed that equals the amount entered during amount entry, the next item is displayed. If the amount keyed does not equal the amount entered during amount entry, but it causes the transaction to balance, the remaining items of the transaction are not displayed, and operation proceeds to the next out-of-balance transaction. If the amount keyed is not equal to the amount entered during amount entry and the transaction is still out of balance, the amount entered during rekey is taken as the new amount and the next item is displayed. The amount rekey procedure is not performed for those transactions containing PASSED items. After all out-of-balance transactions have been handled, operation proceeds to the next step.

At Step 208 the balancing operator interacts with the balancing function. At this point, the operator may request a list of the out-of-balance transactions in the block and select the one which is to be subject to think balancing. Alternatively, the system could make this selection automatically. In either case, the think balancing operations are the same.

When an out-of-balance transaction is selected for think balancing, it is examined by the system for errors, as indicated below, to determine if there are suspect items that could be causing the out-of-balance condition.

| KEYING | TRANSACTION LEVEL |
|---|---|
| Transpositions | Double Posted Items |
| Shifted Digits | Debit Entered as Credit |
| Extra Digits | Credit Entered as Debit |
| Missing Digits | Misplaced Item |
|  | Extra Item |
|  | Missing Item |
|  | Common MICR Misreads |

When the transaction is displayed to the balancing operator (FIG. 15), the first item in each list in the credit and debit windows W3 and W4 that is suspect will be highlighted in order to guide the operator to that item first. There is also an area on the right of the items which can be used to provide comments about the items. For example, if the system considered the suspect item to be an extra item, the comment "extra item" could be provided (not shown in FIG. 15). The dialogue window W6 in FIG. 15 could also be used to provide additional facts.

The operator now tries to use the contents of the display (FIG. 15) to balance the transaction. All of the functions of the keyboard of FIGS. 17 and 18 are available to manipulate the multi-window display, as described previously. The speed at which an out-of-balance transaction can be corrected will be evident by considering the particular transaction display shown in FIG. 15. It is readily apparent from a comparison of the amounts listed on the deposit ticket shown in window W1, with the check amounts listed in window W4, that the $245.00 amount listed on the deposit slip is an incorrect listing, and should be $235.00, which has been highlighted as being suspect in window W4. This is confirmed by the corresponding image of the check in window W5, which is for $235.00.

A further advantage of the multi-window display shown in FIG. 15 is that a customer advice for advising the customer of an incorrect listing (including images) can be prepared at the Workstation 50C while the transaction is being displayed. This is accomplished by depressing the "ADVICE" key in FIG. 17, which will produce a menu in the dialogue window W6 to permit the operator to prepare the advice. FIG. 20 illustrates and example of a typical customer advice letter that may be prepared by an operator using the dialogue window W6. Note that images of the deposit slip and check are advantageously provided by the operator requesting the same during the operator's dialogue with the dialogue window W6.

If an operator cannot balance a transaction, the operator then presses the "Block Pass" key in FIG. 17, causing a new transaction to be displayed for balancing.

7. Image Free and Missing Management

The balancing Workstation 50C also advantageously provides for handling a situation where a document (item) becomes separated from its transaction, and is erroneously placed with another transaction. This could occur, for example, when preparing documents for the Document Processor 32 in FIG. 1. Such a misplaced item will be sorted to its proper pocket (assuming its MICR is acceptable); however, the transaction which lost the item, as well as the transaction which gained the item, will not balance. In order to provide for balancing in such situations, Host 34 (FIG. 1) provides a free item store for storing free items. If, during think balancing, an operator determines that an item in window W3 or W4 (FIG. 15) of a displayed transaction is a free (extra) item (e.g., in response to the "Comments" in window W3 or W4 indicating such), the operator can logically remove the item from the transaction and place the item in the free item store. The operator does this by highlighting the item in its respective window (W3 or W4), and then pressing the "Make Free Item" key in FIG. 18. When appropriate, additional identifying data for the document may be provided by the operator using the dialogue window W6.

On the other hand, if an operator, while viewing the display of a transaction during think balancing determines that an item is missing, the operator may want to see what is in the free item store. To do this, the operator presses the "Display Free Items" key in FIG. 18, which causes candidate free items to be displayed in the dialogue window W6 (FIG. 15). The operator can limit the entries displayed by entering free item search data into the dialogue window W6. For example, if the missing item should have an amount of $100.00, the operator by appropriate entry in the dialogue window W6 can limit the free item search to just those items having an amount of $100.00, in which case, the resulting display in the dialogue window W6 will only be of items having an amount of $100.00. If the operator determines that a displayed free store item belongs to the displayed transaction, the operator can then logically place the missing item in the transaction by pressing the "Get Free Item" key in FIG. 18. If the transaction is thus brought into balance, operation will proceed to the next out-of-balance transaction.

If a missing item is not found for a transaction, the operator can create a missing item advice using the dialogue window W6 (FIG. 15) in a generally similar manner to that previously described for a customer advice (FIG. 20). If at a later time the block containing the missing transaction is worked on again, and the missing item is found (e.g., because the missing item was placed in the free item store after the previous attempt at balancing), the missing item can at this later time be logically placed in the transaction to balance the transaction, as described above. The previously prepared missing item advice will then be deleted. An advice can thus be electronically created at the time it appears to be required (which is the most efficient time to create an advice). Then, if the missing item is found at a later time, the electronically created advice will be deleted and will, thus, not be printed.

The free item store described above is also advantageously employed during the system's transaction level search for "Missing Item" listed in the previously described think balancing error search. When the search detects a missing item in the displayed transaction, candidate items from the free item store will automatically be listed in the dialogue window W6 (FIG. 15) for use by the operator.

8. Priority Transit Shipment

It will be remembered that the Document Processor 32 (FIG. 1) sorts documents into pockets based on MICR destination data, after which the documents in each pocket have to wait for their corresponding transactions to be balanced before they can be encoded by Power Encoder 60 and shipped. For example, particular pockets may contain checks which have to be shipped by a particular deadline which is very near. Of course, they could be power encoded "as is," which is undesirable since there may be checks in this pocket which are from transactions that have not been balanced.

Figure 21:
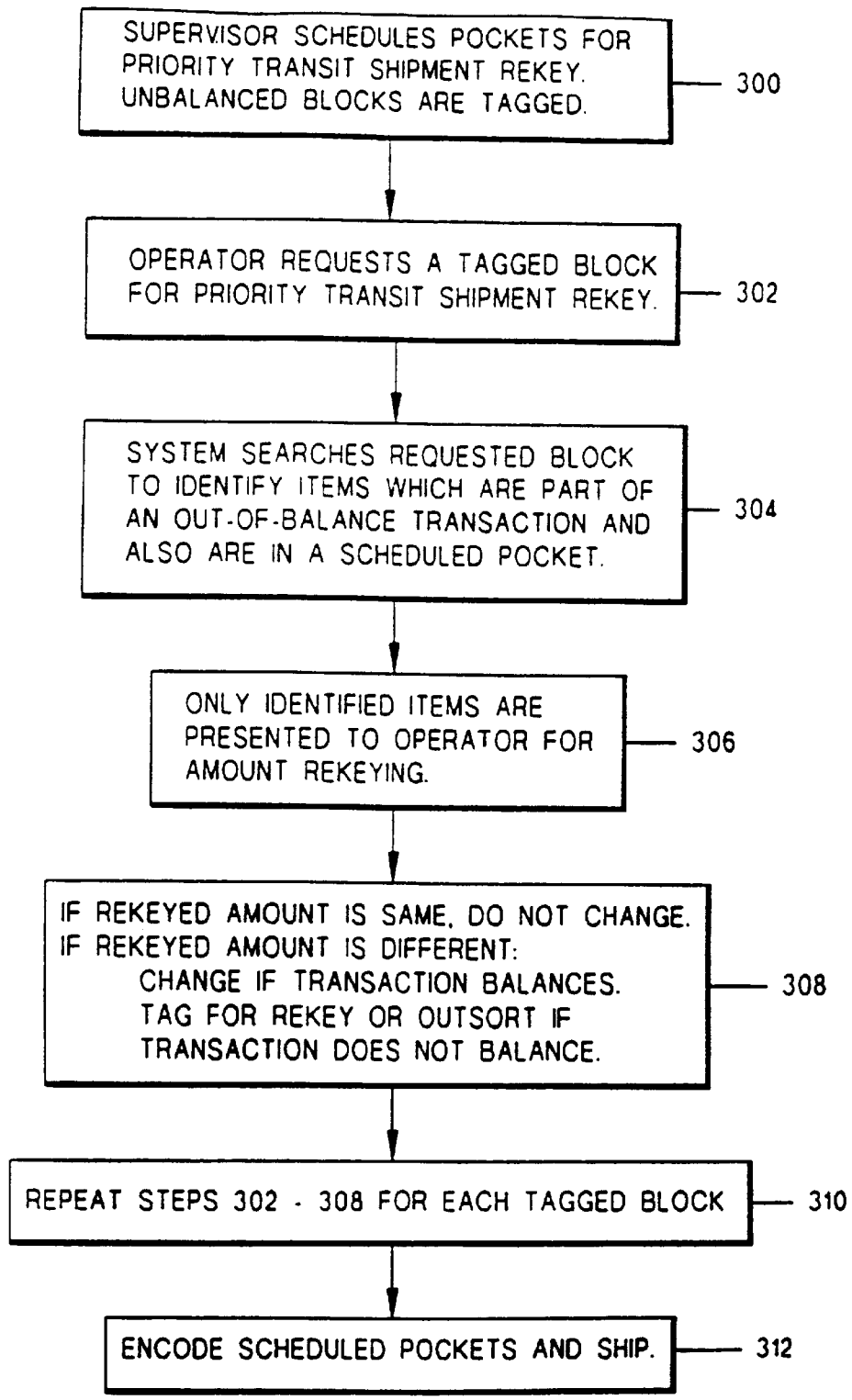
FIG. 21 is a flow diagram illustrating how priority transit shipment is provided in the system of FIG. 1.

The document processing system being described herein provides a particularly advantageous way of handling the above situation, as illustrated by the flow chart of FIG. 21.

As indicated by Step 300, a supervisor schedules one or more pockets for priority transit shipment rekey; unbalanced blocks are tagged accordingly. An operator at a balancing Workstation 50C (Step 302) then requests a tagged block (Step 302). The system searches the requested block for items that are part of an out-of-balance transaction and also are in a scheduled pocket (Step 304). These items (and these items only) are presented to the operator in the same fashion as during amount entry at an Amount Entry Workstation 50A (Step 306). The operator enters the amount as if seeing the item for the first time. The amount that was entered in a previous function is not displayed to the operator. When an amount is entered, one of the following three scenarios takes place (Step 308).

(1)—If the amount entered is the same amount that is in the computer data base for this item, this amount is not changed.

(2)—If the amount entered is different from the amount in the computer data base for this item, but the new amount causes the transaction to balance, the data base amount will be changed to this new amount.

(3)—If the amount entered is different from the amount currently captured for the item, and the new amount does not resolve the out of balance condition, the operator may tag the item for a rekey or simply have the item out-sorted.

As indicated by Step 310 in FIG. 21, Steps 302–308 are repeated for all other tagged blocks. The documents in the scheduled pockets are then encoded by the Power Encoder 60 (FIG. 1) and shipped (Step 312). If later balancing reveals an item was incorrectly encoded, an adjustment suspect report is printed to advise that an incorrectly encoded item was shipped.

9. Automatic Courtesy Amount Reading

It will be remembered from the previous description of the Document Processor 32 in FIG. 1 that it includes the capability of automatically reading a courtesy amount contained on a document, such as, for example, the "$10.00" machine-printed amount shown on the check in FIG. 3, and the "$235.00" handwritten amount shown on the check in FIG. 7. The ability to automatically read such amounts is, of course, of very significant advantage, since it avoids the need for an operator at a Workstation 50 to view the document image in order to enter the amount into the data base maintained in the Host Computer 34. In other words, for every document whose amount is automatically read, there is a corresponding reduction in the number of documents requiring entry by an operator.

Figure 22:
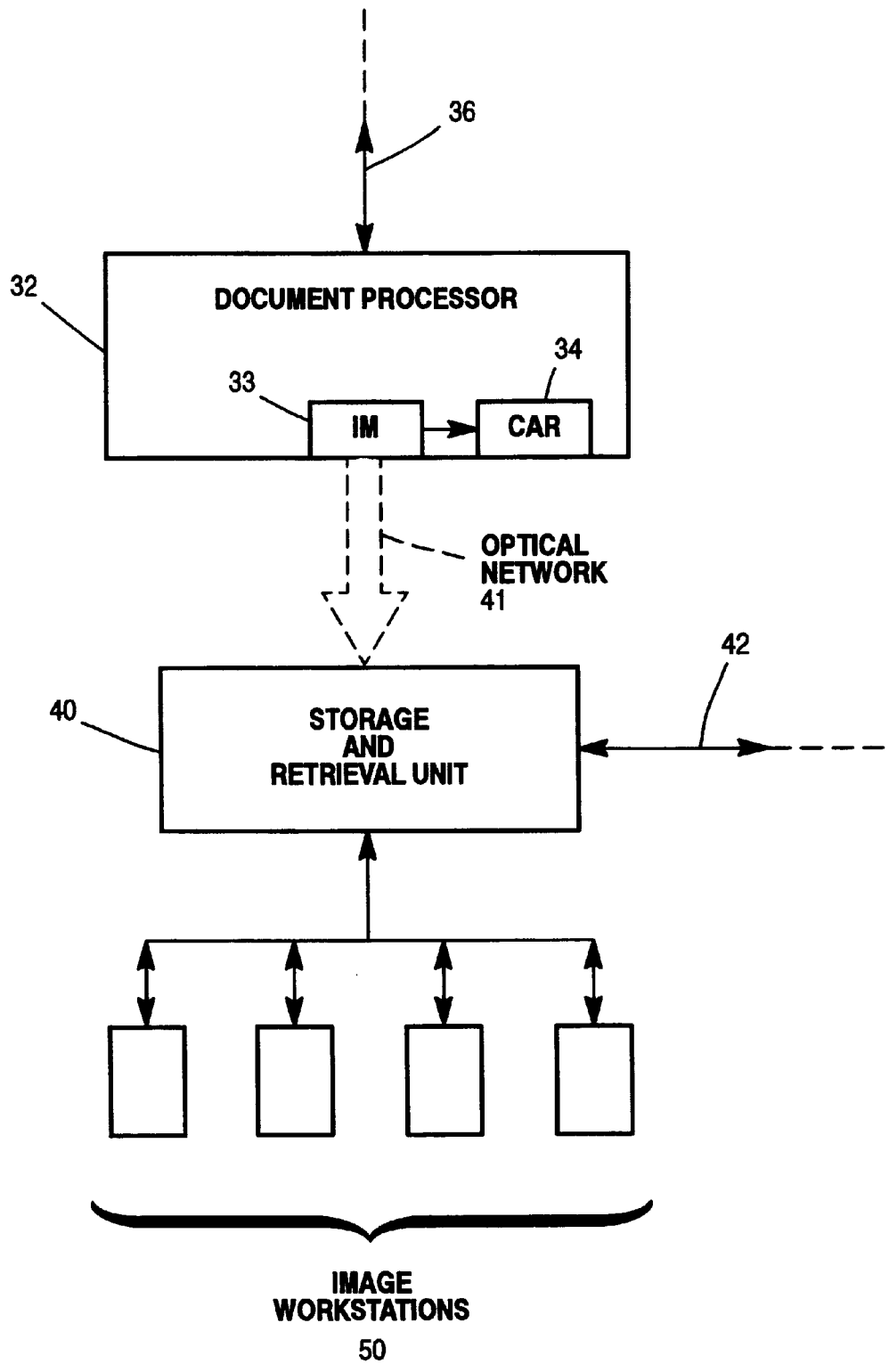
FIG. 22 is a block diagram illustrating portions of the system of FIG. 1 involved in automatically reading financial data on documents processed by the system.

FIG. 22 illustrates portions of the system of FIG. 1 which are concerned with providing automatic courtesy amount reading, and also for selectively storing images and related data of misread documents which have previously been encoded with the correct courtesy amount in highly accurate machine-readable form, such as MICR.

As shown in FIG. 22, the Document Processor 32 includes an Image Module (IM) 33 and a Courtesy Amount Reader (CAR) 34. The Image Module 33 provides for capturing document images, processing and compressing the captured images, and then transmitting the compressed images via Optical Network 41 to the Storage and Retrieval Unit 40. The Image Module 33 in FIG. 19 also provides appropriately processed image data to the CAR 34, which attempts to read the printed or handwritten courtesy amount. As is well known in the financial industry, the courtesy amount comprises the numerical digits ("10.00" in FIG. 3 and "$235.00" in FIG. 7) provided to the right of the payee line.

The CAR 34 uses well known character recognition techniques for reading the courtesy amount from the image data provided by the Image Module 33. The operations of the Image Module 33 and the Courtesy Amount Reader 34 are performed in "real time" as the documents are being sorted by the Document Processor 32.

In the preferred embodiment, the CAR 34 may be turned "on" or "off" for particular documents to be processed at the option of the user. This decision may be determined based on information contained in the MICR code line.

If the CAR 34 is "off" for a document, its amount is entered as described previously, by sending the document image to an appropriate image Workstation. A similar result occurs if the CAR 34 is "on," but is unable to successfully read an amount. Such a "can't-read" result may, for example, be determined by CAR 34 based on its confidence in the accuracy of the recognized amount, as determined by a designated risk level. This risk level may be set by the user, by the MICR code line on a document, and/or may change dynamically based on, for example, the number of documents in a transaction or the dollar amounts involved. The risk level is set to minimize misreads (that is, the acceptance of an incorrectly read amount) since this can significantly increase balancing problems.

If the CAR 34 is "on," two choices may be recorded for the amount read. The first choice is the amount in which the CAR 34 has the most confidence as a accurate read. The second choice is called the "Balance Assist Amount." If a transaction containing an amount read by CAR 34 balances, then there is no need for entry of the amount by an operator at an image Workstation. On the other hand, if the transaction does not balance, then the Balance Assist Amount (Second Choice) is used to assist in balancing.

In the system in which the present invention is used, the Balance Assist Amount is used to assist balancing in a particularly advantageous manner which increases the number of successful automatic reads without unduly increasing the risk of substitutions. This is accomplished in the preferred embodiment by creating the Balance Assist Amount based on determining whether a reasonable alternate digit choice exists for each digit of the first choice amount. For example, for a particular digit position of an amount, the CAR 34 first choice might be a "3" and a reasonably possible second choice might be an "8." The "8" would then constitute the alternate digit for the corresponding digit position of the Balance Assist Amount. If CAR 34 determines that there is no reasonable second choice for a digit position, then the Balance Assist Amount digit will be the same as the first choice digit.

The manner in which the Balance Assist Amount is used to assist in balancing is illustrated in the following examples.

EXAMPLE 1

For this example, it will be assumed that a transaction comprises two items: (a) a check for $123.45 and (2) a deposit slip for $123.45. Since the check and deposit slips agree, the transaction is initially balanced.

Also assume that when the above two items are passed through the Document Processor, only the check amount is capable of being read by the CAR 34, the deposit amount being entered at a Workstation. The following results are obtained:

| Item | Actual Amount | CAR First Choice or Manual Entry | CAR Balance Assist |
|---|---|---|---|
| (1) check | $123.45 | $128.45 | $723.62 |
| (2) deposit | $123.45 | $123.45 | None |

Note that the above transaction will not balance because the CAR first choice amount of $128.45 for the check is different from the Workstation amount of $123.45 for the deposit. The first step in attempting to balance the transaction is to determine which digit positions of the Workstation and the CAR first choice amounts are not in agreement. In the present exemplary system, if agreement failure is found for more than one digit, then no further attempt is made to obtain balancing using the Balance Assist Amount, and the transaction is balanced at a Balancing Workstation as described previously herein. However, if the level of risk permits, agreement failures in additional digit positions may be permitted for these balance assist operations.

Since only a single digit position fails to be in agreement in the above example (that is, the "8" and "3" in the dollar position), operation proceeds to determine whether the transaction could be made to balance by substituting the corresponding digit of the Balance Assist Amount (which is the dollar digit "3") for its corresponding digit in the first choice amount (which is the dollar digit "8"). It will be evident that this substitution of the "3" in the dollar position of the Balance Assist Amount for the "8" in the first choice amount does produce a balance since both the check and the deposit amounts are not $123.45. The substitution could thus be made and there would be no need to have the image of the CAR-read document sent to a Workstation. However, dependent upon the risk level, the use of this substitution approach could be limited to use only for agreement failures in the dollar or cents digits, but not for the tens or greater digits. Of course, if a substitution of the corresponding dollar or cents digits of the Balance Assist Amount does not produce a balance, the CAR-read item would be sent to the Image Workstation for entry.

EXAMPLE 2

For this example, assume that a transaction comprises three items: (1) a check for $123.45, (2) a check for $987.65, and (3) a deposit slip for $1111.10. Since the sum of the checks is equal to the deposit, the transaction is initially balanced.

Also assume that when the above three items are passed through the Document Processor, only the check amounts are able to be read by CAR 34, the deposit amount being entered at an Image Workstation. The following results are obtained:

| Item | Actual Amount | CAR First Choice or Manual Entry | CAR Balance Assist |
|---|---|---|---|
| (1) check | $987.65 | $987.65 | $631.82 |
| (2) check | $123.45 | $128.45 | $723.62 |
| (3) deposit | $1111.10 | $1111.10 | None |

Note that the above transaction will not balance because the sum of the CAR first choice amounts of $128.45 and $987.65 for checks (1) and (2), respectively, does not equal the Workstation deposit amount of $1111.10. The first step in attempting to balance the transaction is to determine which digits are not in agreement. Where more than two items are present in the transaction, digit agreement is determined with respect to the sum of the debits (e.g., checks) and the sum of the credits (e.g., deposits). For this example, the sum of the credits (checks (1) and (2)) is $1116.10 ($987.65+$128.45), while the sum of the credits (deposit of $1111.10) is $1111.10 as shown below:

Sum of Credits=($987.65+$128.45)=$1116.10

Sum of Debits=($1111.10)=$1111.10

It will be seen that, for the above debit and credit sums, a digit agreement failure is present only for the dollar digits "6" and "1." Accordingly, operation proceeds to determine whether substitution of corresponding digits of the Balance Assist Amounts could produce a balance. Each Balance Assist Amount is tested in turn. For check (1), the dollar digit "1" of the Balance Assist Amount $631.82 is substituted for the dollar digit "7" of the CAR first choice amount $987.65 for check (1). The debit sum is then recalculated and found to be $1110.10, which still does not equal the credit sum (deposit) of $1111.10, so that the transaction remains unbalanced. This substitution for check (1) is thus rejected.

The Balance Assist Amount of check (2) is next tested, the dollar digit "3" of the Balance Assist Amount $723.62 being substituted for the dollar digit "8" of the CAR first choice amount $128.34 of check (2). This time the recalculated sum of $1111.10 does equal the credit sum, so that the transaction is now balanced, in which case the images of the CAR-read checks (1) and (2) need not be sent to an Image Workstation. If the sum resulting from this substitution for check (2) did not produce a balance, images of all CAR-read amounts in the transaction would be sent to a Workstation for amount entry. If dictated by the then applicable risk level, images of CAR-read items would also be sent to an Image Workstation if the digit agreement failure occurred for digits other than the dollar and cents digits.

III. The Present Invention

The present invention provides an improved method to the balancing operator and the rekey operator for quickly correcting an out-of-balance transaction.

The improved method is made possible by various characteristics returned from the CAR 34 and other characteristics as detected by the Automatic Force Balancing processing. By examining the characteristics returned, the Automatic Force Balancing (FIG. 19, Step 204) attaches a priority weight to each of the items in the transaction.

During Automatic Force Balancing, certain characteristics, in addition to those returned from the Courtesy Amount Reader, are derived and considered in calculating the priority weight for each item in the transaction. FIGS. 23 through 26 illustrate the processing involved with respect to the present invention.

Figure 23:
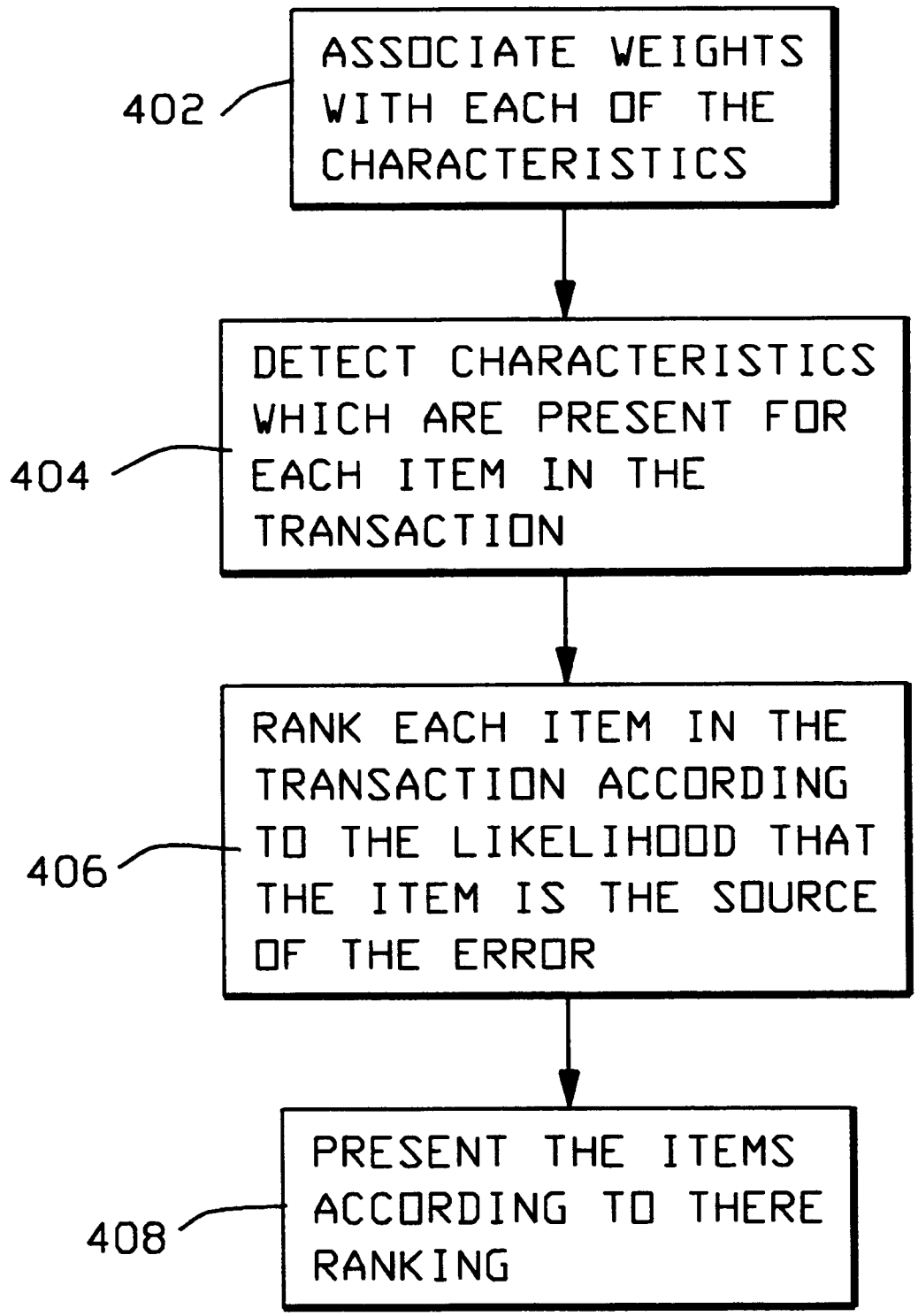
FIG. 23 is a flow diagram showing the general processing of the present invention.

FIG. 23 is a flow diagram showing the general processing of the present invention. It should be understood that the steps shown are those needed to accomplish the objects of the present invention within the framework of the general system in which the present invention is used. Each of the processing steps occurs at different stages of processing within the entire system. Therefore, even though the processing steps are sequentially shown, intervening processing occurs to accomplish the objectives of the system as a whole.

Step 402 of FIG. 23 specifies that predetermined weights are to be associated with each of the characteristics possible for an item in the transaction. The presence of a characteristic for an item in an out-of-balance transaction is indicative that item is suspect; that is, the item may be the source of the error. Each specific characteristic will be discussed in greater detail in the discussion accompanying the Characteristic Priority Table.

At some time after the weights have been assigned to the characteristics, and after the CAR 34 has attempted to recognize the amounts for each of the items in the transaction, Step 404 provides for detecting which of the characteristics (as identified in the Characteristic Priority Table) are present for each of the items in the transaction. Once an item's characteristics are identified, the items are ranked at Step 406 according to the likelihood that each item is the source of error in the out-of-balance transaction. The ranking of each item is based upon which characteristic(s) is present for an item and the weight(s) associated with the present characteristic(s).

The final processing Step 408 is to present the items in the transaction to the operator in an order from the item whose characteristics indicate that the item is most likely to be the source of an error in the transaction to the item whose characteristics indicate that the item is least likely to be the source of an error in the transaction.

After prioritizing the items in an out-of-balance transaction for a balancing operator, the operator can then make the appropriate changes to balance the transaction as described with FIGS. 15 through 20.

The Characteristic Priority Table below is used for determining the relative priority of suspect items in an out-of-balance transaction.

| Characteristic Priority Table | |
|---|---|
| Characteristic | Weight |
| Significant Digit | 50 |
| Multiple Balance | 48 |
| High Risk Digit 0 | 31 |
| High Risk Digit 1 | 32 |
| High Risk Digit 2 | 33 |
| High Risk Digit 3 | 34 |
| High Risk Digit 4 | 35 |
| High Risk Digit 5 | 36 |
| High Risk Digit 6 | 37 |
| High Risk Digit 7 | 38 |
| High Risk Digit 8 | 39 |
| High Risk Digit 9 | 40 |
| High Risk Digit 10 | 41 |
| High Risk Digit 11 | 42 |
| High Risk Digit 12 | 43 |
| High Risk Digit 13 | 44 |
| High Risk Digit 14 | 45 |
| High Risk Digit 15 | 46 |
| Hand-written | 10 |
| Machine Printed | 9 |
| Complex Cents Field | 8 |
| Small Amount | 7 |
| Soft Reject | 6 |
| Dash Trailing | 5 |
| Touching Characters | 4 |
| Post-processing Reject | 3 |
| Transposition | 15 |
| Extra Digit | 18 |
| Missing Digit | 17 |
| Shifted Digit | 14 |
| Wrong Digit | 13 |
| Common MICR Misread | 16 |
| Double Posted Item | 28 |
| Free List Match | 30 |
| Missing Credit | 26 |
| Extra Debit | 21 |
| Extra Credit | 20 |
| Credit as Debit | 23 |

-continued

Characteristic Priority Table

| Characteristic | Weight |
|---|---|
| Debit as Credit | 24 |
| Missing Debit | 12 |
| Misplaced Item in Batches | 11 |

Each possible characteristic is identified on left hand side of the table, and the associated weight is on the right hand side of the table. The weights in the table are those which were associated in Step 402 of FIG. 23. By the convention selected for this embodiment, those characteristics whose presence would indicate that an item is more likely to be the source of an error in a transaction are given a higher weight. Thus, the item with the highest priority value, as determined from the present characteristics, is the most likely source of the error. Those skilled in the art will recognize that an equivalent alternative would be to assign lower weights to those characteristics whose presence indicates that an item is more likely to be the source of an error in a transaction. Then, the item with the calculated lowest priority value would be the likeliest source of error.

The following discussion pertains to each of the characteristics in the table and the importance of each as indicating an item to be in error. As shown in the table, each of the characteristics has been assigned a weight. It should be noted that these weights are not absolute; that is, the relative weights chosen are based on the inventors' collective experience in developing prior generations of check image processing systems. Those skilled in the art will recognize that the weights can be adjusted according to a particular mix of document images processed by a system and the relative likelihood that a characteristic indicates that an item processed is the source of the error. For instance, in the documents processed by another system, one may find that transposition errors occur most often in the amounts processed. In this case, the "transposition" characteristic could be given a higher weight than the weight of 15 chosen in the illustrated embodiment. Each characteristic is explained below.

Significant-Digit

The Significant-Digit characteristic indicates that a digit from the balance assist field (as previously discussed) or "second choice amount" would, if substituted for the first choice digit for the amount, balance the transaction. The substitution was not made during the automatic balancing phase because the digit occupied a position whose significance was too great to risk an error with an automatic substitution. The preferred embodiment has assigned this characteristic the highest weight (50) based on the analysis of sample checks which indicates that when an item exhibits this characteristic, the probability is high that the item is the source of the out-of-balance condition.

Multiple-Balance

The Multiple-Balance characteristic indicates that a plurality of items in a transaction have alternate digits from the balance assist field which could have been used to fix the out-of-balance condition. Each item with an alternate digit which would balance the transaction is deemed to possess this characteristic. Take as an example the following simple deposit transaction:

| Item | Actual Amount | CAR First Choice or Manual Entry | CAR Balance Assist |
|---|---|---|---|
| (1) check | $123.45 | $128.45 | 723.62 |
| 2) check | $678.90 | $678.90 | 813.46 |
| 3) check | $25.00 | $25.00 | 70.66 |
| 4) check | $63.00 | $63.00 | 08.66 |
| 5) check | $1572.65 | $1572.65 | 7617.06 |
| 6) check | $8.02 | $8.02 | 3.65 |
| 7) check | $2301.79 | $2301.79 | 9817.29 |
| 8) deposit | $4772.81 | $4772.81 | 3867.19 |

The total of the debit items (checks) based on the CAR First Choice amounts is ($128.45+$678.90+$25.00+$63.00+$1572.65+$8.02+$2301.79)=$4777.81. The debit item total does not equal the deposit ticket amount recognized for this transaction, $4772.81, and therefore the transaction is out-of-balance.

The amount by which the transaction is out of balance is equal to the total of the checks recognized less the recognized deposit amount, $4777.81−$4772.81=$5.00. Each CAR Balance Assist Amount is checked against each of the CAR First Choice amounts. If for more than a single item in the transaction the difference between the CAR Balance Assist Amount ones digit and the CAR First Choice Amount ones digit is equal to 5, the Multiple-Balance characteristic is detected for each of the amounts. In the example above, the CAR First Choice Amount $128.45 and the corresponding CAR Balance Assist amount $773.96 is one item in the transaction which has a ones digit difference equal to 5. A second item in the transaction for which the ones digit difference is equal to 5 is the CAR First Choice Amount $25.00 and the corresponding CAR Balance Assist amount $70.66. It will also be noticed that the item for which the CAR First Choice amount is $8.02 has a ones digit difference with its corresponding CAR Balance Assist amount, $3.65, equal to 5. Because there are multiple items for which a single character substitution would balance the transaction, each of the items possesses the Multiple-Balance characteristic.

Highest-Risk-Digit

The Highest-Risk-Digit characteristic is best explained by way of example. Consider the following transaction:

| Item | Actual Amount | CAR First Choice or Manual Entry | CAR Balance Assist |
|---|---|---|---|
| (1) check | $123.45 | $128.45 | 723.62 |
| 2) check | $678.90 | $678.90 | 813.46 |
| 3) check | $25.00 | $75.00 | 26.66 |
| 4) check | $63.00 | $63.00 | 08.66 |
| 5) check | $1572.65 | $1572.65 | 7617.06 |
| 6) check | $3.02 | $3.02 | 8.65 |
| 7) check | $2301.79 | $2301.79 | 9817.29 |
| 8) deposit | $4772.81 | $4772.81 | 3867.19 |

The computed total of the debit items (checks) based on the CAR First Choice amounts is: ($128.45+$678.90+$75.00+$63.00+$1572.65+$8.02+$2301.79)=$4822.81. The debit item total does not equal the deposit ticket amount recognized for this transaction, $4772.81, and therefore the transaction is out-of-balance. The difference between total of the CAR First Choice amounts, $4822.81, and the recognized deposit amount of $4772.81 is $50.00. The difference of $50.00 indicates to the expert balancer that the items in the transaction should be examined for digits in the tens position whose character recognition confidence level in the CAR First Choice amount is the least. If the difference had been $5.00, the digit in the ones position in the First Choice amounts would be checked; if the difference had been $500.00, the digit in the hundreds position of the First Choice amounts would be checked, and so on. Each item in the transaction is examined to determine the presence of the Highest-Risk-Digit characteristic. If the expert balancer finds that the digit with the highest risk factor (least confidence) in a CAR First Choice amount corresponds to the tens position, the item is deemed to possess the Highest-Risk-Digit characteristic.

With respect to the example above, if the expert balancer detects that in the third item, whose CAR First Choice amount is $75.00, the digit recognized by the Courtesy Amount Reader with the least confidence (Highest Risk) is the "7", then the third item possesses the Highest-Risk-Digit characteristic since the "7" occupies the tens position. Similarly, if the seventh item, $2301.79, has the "0" as the Highest-Risk-Digit, then the seventh item possesses the Highest-Risk-Digit characteristic.

Hand-Written

The Hand-written characteristic is assigned to an item whose courtesy amount is written by hand as opposed to being printed by a machine. This characteristic is detected by the Courtesy Amount Reader using well known character recognition techniques and passed as an attribute of the amount to other units for further processing.

Machine-Printed

The Machine-Printed characteristic is assigned to an item whose courtesy amount is printed by hand as opposed to being hand-written. This characteristic is detected by the Courtesy Amount Reader using well known character recognition techniques and passed as an attribute of the amount to other units for further processing. As compared to amounts which are hand written, machine printed amounts are less likely to be a recognition error. Therefore, the Machine-Printed characteristic is given less weight than the Hand-written characteristic.

Complex-Cents-Field

When the Courtesy Amount Reader detects that the cents portion of a courtesy amount is other than a simple ".XY", for example, "14/100", the Complex-Cents-Field characteristic is present. The Courtesy Amount Reader detects this presence during its character recognition processing and returns this attribute with the recognized amount for further processing.

Small-Amount

This characteristic is detected by the Courtesy Amount Reader when the size of the characters upon which the recognition was performed was unusually small. A predefined threshold size is used to determine when an amount is small. The particular threshold size used is not necessary for understanding the present invention and is dependent on the particular mix of documents and type fonts processed by the system.

An example where the Small-Amount characteristic may be found is on a document which has words to the effect: "Do not cash if greater than $100.00." These words may be printed on the top of the document in a relatively small type font, and the actual amount handwritten somewhere else on the document. The Courtesy Amount Reader may read the $100.00 instead of the actual amount for which the document was redeemed thereby causing the transaction to be out-of-balance. If a distinguishing feature of the $100.00 amount is that it is typed in a small font, then the Small-Amount characteristic is a good indicator that the document may be the source of the error in the out-of-balance transaction.

Soft-Reject

The Courtesy Amount Reader detects this characteristic when the characters in the amount were recognized with substantial confidence, but the format in which the amount was entered is ambiguous as to where the dollars and cents fields are separated. Two particular examples are: "$1234", and "$1234-", where there is neither a decimal field nor a complex cent field.

Dash-Trailing

When the amount recognized by the Courtesy Amount Reader has a "-" as the last character, the Dash-Trailing characteristic is assigned to the amount by the Courtesy Amount Reader. An example would be "$25.-"

Touching-Characters

If an image such as " " is passed to the Courtesy Amount Reader for recognition, the Touching-Characters characteristic is assigned to the amount.

Post-Processing-Reject

The Post-Processing-Reject characteristic is present for an item when the amount format deviates from conventions followed in the United States when printing check amounts. Typical examples include: a comma in the wrong position, $1,234,56.78; a missing comma, $1,234567.89; and a decimal in the wrong position, $123,456.789. The Courtesy Amount Reader returns this status for further processing by the Automatic Force Balancing (Step 204 of FIG. 19)2.

Transposition

A possible transposition error is detected by the expert balancer when two digits within a single amount, if switched, would cause the transaction to balance. For example, if the amount $687.90 was the amount entered for an item in a transaction which is out-of-balance, and the amount $678.90 would balance the transaction, the item possesses the Transposition characteristic.

Extra and Missing Digit

If the credit item total less the debit item total for a transaction is less than zero, there is possibly an extra digit in one of the debit items or a missing digit in a credit item. If the credit item total less the debit item total is greater than zero, then there is possibly a missing digit in one of the debit items or an extra digit in a credit item.

The Extra-Digit characteristic is present in an amount when the expert balancer detects that a transaction does not balance, and that if one of the digits in an amount is removed, the transaction balances. For example, if the transaction consists of:

| Item | Actual Amount | Manual Entry |
| --- | --- | --- |
| 1) check | $15.00 | $150.00 |
| 2) check | $1250.95 | $1250.95 |
| 3) check | $3531.65 | $3531.65 |
| 4) check | $2062.10 | $2062.10 |
| 5) deposit | $6859.70 | $6859.70 |

In this example, the manually entered deposit amount, $6859.70, does not balance with the total of the manually entered checks, $150.00+$1250.95+$3531.65+$2062.10= $6994.70. Because the difference amount, which is the manually entered deposit total, $6859.70, less the total of the manually entered checks, $6994.70, is less than zero ($6859.70−$6994.70=−$135.00), there is a possibility that an Extra-Digit is present in one of the check amounts.

In detecting whether an item in the transaction possesses the Extra-Digit characteristic, the processing proceeds as follows. First, the least significant non-zero digit in the difference amount, −$135.00, is detected ("5" in this example). The "5" occupies the tens position in the difference amount; therefore, taking one check at a time, the tens digit is removed and a test is performed to determine whether the transaction thereafter balances. In this example, removing the tens position "0" from $150.00 leaves $15.00, which brings the transaction into balance ($15.00+ $1250.95+$3531.65+$2062.10=$6859.70). Therefore, the check manually entered as $150.00 possesses the Extra-Digit characteristic.

Contrary to the Extra-Digit characteristic, the Missing-Digit characteristic is present in an amount when the expert balancer detects that a transaction is out-of-balance, and if the amount in the transaction had another digit, the transaction would balance. Take for example, the following transaction:

| Item | Actual Amount | Manual Entry |
| --- | --- | --- |
| 1) check | $3526.48 | $35926.48 |
| 2) deposit | $3526.48 | $3526.48 |

The computed total of the manually entered check is simply $35926.48. The manually entered deposit amount, $3526.48, does not equal the computed total, and therefore, the transaction is out-of-balance. Because the difference amount, which is equal to the manually entered deposit total, 3526.48, less the total of the manually entered check, $35926.48, is less than zero ($3526.48−$35926.48=− $32400.00), there is a possibility that the manually entered deposit amount is missing a digit. The specific digit to insert into the deposit amount is determined by summing the digits in the difference amount, 3+2+4=9. Note that if the sum of the digits in the difference amount exceeds 9, the digits in the computed sum are added again. For example, if the sum of the digits in the difference amount was 5+6=11, the digits in the sum would be summed again, 1+1=2, and 2 would be the digit to insert. When the digit 9 is inserted in the deposit amount at the position of the least significant non-zero digit in the difference amount (the hundreds position), the deposit amount becomes $35926.48 and the transaction thereafter balances. Thus, the credit amount possesses the Missing-Digit characteristic.

Shifted-Digit

An amount exhibits the Shifted-Digit characteristic when the expert balancer detects that by increasing or decreasing an amount by an order of magnitude, the transaction can be made to balance. For example, if a transaction consists of the following:

| Item | Actual Amount | Manual Entry |
| --- | --- | --- |
| 1) check | $104.90 | $10.49 |
| 2) check | $678.90 | $678.90 |
| 3) deposit | $807.35 | $807.35 |

The expert balancer computes the total from the two manually entered checks to be: ($10.49+$678.90)=$689.39. The deposit amount manually entered was $807.35. Since the computed total and the entered deposit total are not equal, the transaction does not balance. The expert balancer examines each amount in the transaction. If an amount multiplied by 10, where n is an integer, and the transaction thereafter balances, the amount exhibits the Shifted-Digit characteristic. In the example above, if the first amount, $10.49, is multiplied by 10, the result is $104.90 and the transaction balances. Therefore, the first amount exhibits the Shifted-Digit characteristic.

Wrong-Digit

If a transaction is out-of-balance, and changing one digit in an item to another digit balances the transaction, and the one digit is commonly mistaken for the other digit, either in manual entry or in character recognition, the Wrong-Digit characteristic attaches to the item. Digits which are commonly mistaken one for another are identified in a Wrong Digit Table. The Wrong Digit Table is an 10 by 10 cell array as shown below.

Wrong Digit Table

|   | 0 | 1 | 2 | 3 | 4 | 5 | 6 | 7 | 8 | 9 |
| --- | --- | --- | --- | --- | --- | --- | --- | --- | --- | --- |
| 0 | 0 | 1 | 1 | 0 | 0 | 0 | 1 | 0 | 0 | 0 |
| 1 | 1 | 0 | 1 | 0 | 1 | 0 | 0 | 1 | 0 | 0 |
| 2 | 1 | 1 | 0 | 1 | 0 | 1 | 0 | 0 | 0 | 0 |
| 3 | 0 | 0 | 1 | 0 | 0 | 0 | 1 | 0 | 0 | 0 |
| 4 | 0 | 1 | 0 | 0 | 0 | 1 | 0 | 1 | 0 | 0 |
| 5 | 0 | 0 | 1 | 0 | 1 | 0 | 1 | 0 | 1 | 0 |
| 6 | 0 | 1 | 0 | 0 | 1 | 0 | 1 | 0 | 0 | 1 |
| 7 | 0 | 1 | 0 | 0 | 1 | 0 | 0 | 0 | 1 | 0 |
| 8 | 0 | 0 | 0 | 0 | 0 | 1 | 0 | 1 | 0 | 1 |
| 9 | 0 | 0 | 0 | 0 | 0 | 0 | 1 | 0 | 1 | 0 |

A cell in the table indicates whether the digit indexing the row for the cell is commonly mistaken for the digit indexing the column for the cell. Likewise, each cell in the table indicates whether the digit indexing the column for the cell is commonly mistaken for the digit indexing the row for the cell. For instance, the cell at the row indexed by the digit "8", and the column indexed by the digit "5" contains a 1, indicating that the digit "8" is commonly mistaken for the digit "5". The cells having a 1 in the table above indicate the defaults used in the system in which the present invention is used, and may be adjusted to suit the needs of other systems for which different digits are commonly mistaken one for another.

The following example illustrates how the presence of the Wrong-Digit characteristic is detected.

| Item | Actual Amount | CAR First Choice or Manual Entry Amount |
| --- | --- | --- |
| 1) check | $123.45 | $123.45 |
| 2) check | $678.90 | $378.90 |
| 3) deposit | $802.35 | $802.35 |

The transaction is out-of-balance since the computed CAR First Choice or Manual Entry Amount check total, $123.45+ $378.90=$502.35 (referred to as "check total" for this example), and the CAR First Choice or Manual Entry Amount deposit (item 3)) is $802.35 (referred to as "deposit amount" for this example).

The Wrong-Digit characteristic is detected as follows. First, the deposit amount is subtracted from the check total, $502.35−$802.35=−$300.00. The −$300.00 is referred to as the "difference amount". Then, for each item in the transaction, the number of trailing zeros in the difference amount is then used to determine which digit in an item may be wrong. For this example, the number of trailing zeros in the difference amount, $300.00, is 4.

Next, for the item under examination, the error position is determined. Item 2), for which a check amount of $378.90 was entered, has 5 digits. The error position in item 2) is determined by subtracting the number of trailing zeros in the difference amount, 4, from the number of digits in the item in being examined, 5. The error position of 1 (first digit from the left of $378.90) is then used to determine whether item 2) exhibits the wrong-digit characteristic.

The digit at position 1, the hundreds position, in item 2) ($378.90) is "3". "3" is used as the row index in the Wrong-Digit-Table. The column index in the Wrong-Digit-Table is determined by subtracting from the computed row index, 3, the digit in the hundreds position of the difference amount, −3 (3−(−3)=6). It should be noted that because the difference amount is less than zero, the digit subtracted from the row index is also negative. The cell in the Wrong-Digit-Table at row 3, column 6 is a 1. Therefore the wrong-digit characteristic attaches to item 2) in the example transaction. Note that if item 2) was $678.90, the transaction would balance.

Common-MICR-Misread

Some of the amounts associated with items in a transaction may be the result of magnetic character reading. Even though the magnetic printed characters are more uniform than the handwritten amounts which are optically recognized, the magnetic characters are subject to misreads also. Common MICR misreads include reading a "1" as a "7", a "3" as an "8", and a "0" as a "6". The commonly misread characters are maintained in a lookup table for this purpose. If the expert balancer detects that a transaction is out-of-balance, changing a digit in an item would balance the transaction, and the digit changed is a digit which is commonly misread by the magnetic character reader, then the item possesses the Common-MICR-Misread characteristic.

The following example transaction illustrates the Common MICR Misread situation:

| Item | Actual Amount | MICR Amount |
|---|---|---|
| 1) check | $123.45 | $723.45 |
| 2) check | $678.90 | $678.90 |
| 3) deposit | $802.35 | $802.35 |

The transaction is out-of-balance since the computed MICR Amount check total, $723.45+$678.90=$1402.35, and the MICR Amount deposit is $802.35.

The Common-MICR-Misread characteristic is detected as follows. First, the computed MICR Amount check total is subtracted from the MICR Amount deposit, $802.35−$1402.35=−$600.00. Next, the transaction is checked by adding the difference amount, −$600.00, to an item in the transaction to obtain a "should-be" amount, for example $723.45+(−$600.00)=$123.45. If the transaction thereafter balances with the should-be amount, and a digit in the should-be amount, $123.45, and the corresponding digit in the original MICR Amount, $723.45, are commonly mistaken during magnetic character reading, then the item possesses the Common-MICR-Misread characteristic. In comparing these two amounts, it can be seen that the "1" in the should-be amount is commonly mistaken for a "7" by the magnetic character reader. Therefore, the item possesses the Common-MICR-Misread characteristic.

The digits for which the Common-MICR-Misread characteristic is detected may vary from machine to machine. The misreads may be traced to the reliability of the MICR printers which print the check amount and the reliability of the MICR readers which read the MICR amount. Oftentimes a balancing operator will have accumulated the knowledge of which digits are commonly mistaken by the MICR reader and is able to make the appropriate correction. The system in which the present invention is used implements the balancing operator's knowledge in the form of a two-dimensional array referred to as the MICR Misread Table.

The MICR Misread Table is an 10 by 10 cell array as shown below.

MICR Misread Table

|   | 0 | 1 | 2 | 3 | 4 | 5 | 6 | 7 | 8 | 9 |
|---|---|---|---|---|---|---|---|---|---|---|
| 0 | 0 | 0 | 0 | 0 | 0 | 0 | 0 | 1 | 0 | 0 | 0 |
| 1 | 0 | 0 | 0 | 0 | 0 | 0 | 0 | 0 | 1 | 0 | 0 |
| 2 | 0 | 0 | 0 | 0 | 0 | 0 | 0 | 0 | 0 | 0 | 0 |
| 3 | 0 | 0 | 0 | 0 | 0 | 0 | 0 | 0 | 0 | 1 | 0 |
| 4 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 |
| 6 | 1 | 0 | 0 | 0 | 0 | 0 | 0 | 0 | 0 | 0 | 0 |
| 7 | 0 | 1 | 0 | 0 | 0 | 0 | 0 | 0 | 0 | 0 | 0 |
| 8 | 0 | 0 | 0 | 1 | 0 | 0 | 0 | 0 | 0 | 0 | 0 |
| 9 | 0 | 0 | 0 | 0 | 0 | 0 | 0 | 0 | 0 | 0 | 0 |

A cell in the table indicates whether the digit indexing the row for the cell is commonly mistaken for the digit indexing the column for the cell. Likewise, each cell in the table indicates whether the digit indexing the column for the cell is commonly mistaken for the digit indexing the row for the cell. For instance, the cell at row eight (8), column three (3) contains a 1, indicating that the MICR representation of the digit "8" is commonly mistaken for the MICR representation of the digit "3". The cells set in the table above indicate the defaults used in the system in which the present invention is used, and may be adjusted to suit the needs of other systems for which different MICR digits are commonly misread.

Double-Posted-Item

If the expert balancer detects that: 1) a transaction is out of balance, 2) two amounts in the transaction are identical, and 3) the amount by which the transaction is out-of-balance is equal to one of the identical amounts, then each of the identical amounts exhibits the Double-Posted-Item characteristic.

Free-List-Match

If the amount for an item in the free item store (discussed previously) is equal to the amount by which the transaction is out of balance, the Free-List-Match characteristic is present for the identified item in the free item store. It will be remembered that the free item store is logically separate from the items within a transaction. Therefore, when the free item store is displayed by the balancing operator, the items are presented in an order in which the free items most likely to be associated with the transaction being balanced are displayed first.

Extra-Debit

The Extra-Debit characteristic is exhibited by an item in a transaction when the amount by which the transaction is out of balance is equal to the amount for a debit item in a transaction.

Extra-Credit

The Extra-Credit characteristic is exhibited by an item in a transaction when the amount by which the transaction is out of balance is equal to the amount for a credit item in a transaction.

Credit-as-Debit

If a transaction is out-of-balance, and the debit item total exceeds the credit item total by an amount which is equal to twice the amount of one debits, then one of the items listed as a debit is possibly a credit. If this is the case, the particular debit item exhibits the Credit-as-Debit characteristic.

Debit-as-Credit

If a transaction is out-of-balance, and the credit item total exceeds the debit item total by an amount which is equal to twice the amount of one of the credit items, then one of the items listed as a credit is possibly a debit. If this is the case, the particular credit item exhibits the Debit-as-Credit characteristic.

Missing-Debit

As discussed earlier, sometimes checks end up being associated with the wrong transaction. If the amount by which the transaction is out-of-balance is equal to one of the debit items, then the item exhibits the Missing Debit characteristic. The Missing-Debit characteristic refers to the fact that the debit item is missing from another transaction. For example consider the following transaction:

| Item | Actual Amount | Manual Entry or CAR Amount |
|---|---|---|
| 1) check | $104.90 | $104.90 |
| 2) check | $678.90 | $678.90 |
| 3) deposit | $678.90 | $678.90 |

Notice that the total of the amounts entered, ($104.90+$678.90)=$783.80, does not equal the amount entered for the deposit total, $678.90. In this example, the transaction is out-of-balance by $104.90, which is equal to check 1). Therefore, check 1) possesses the Missing-Debit characteristic.

Missing-Credit

Similar to checks, deposit tickets may sometimes end up being associated with the wrong transaction. If the amount by which a transaction is out-of-balance is equal to the amount of a credit item in the transaction, then the credit item exhibits the Missing-Credit characteristic. That is, this credit item is one which is possibly missing from another out-of-balance transaction.

Misplaced-Item-in-Batches

If 1) a first transaction is out-of-balance wherein the deposit amount is greater than the total of the checks; 2) a second transaction is out-of-balance wherein the deposit amount is less than the total of the checks; and 3) there is a check in the second transaction whose amount is equal to the amount by which the first transaction is out-of-balance, then the check in the second transaction possesses the Misplace Item in Batches characteristic. In simple terms, during the course of handling multiple transactions consisting of multiple checks, a check may be grouped in the wrong set of documents, thereby causing two out-of-balance transactions. The first out-of-balance transaction would be the transaction having the extra check, and the second out-of-balance transaction would be the transaction having the missing check.

Appendix A shows the general algorithm for calculating the priority of an item, wherein the priority relates to the likelihood that an item is the cause of an out-of-balance transaction. Generally, this processing takes place within the Automatic Force Balancing (Step 204 of FIG. 19) phase. As Automatic Force Balancing attempts to automatically balance the transaction, it also calculates a priority value for each item in the transaction and adds the item to a priority list.

Generally, the processing involves examining each item in the transaction to determine its priority based on its characteristics, and then inserting the item into the priority list for the transaction. As indicated by pseudocode statement 702, each item in the transaction is processed according to pseudocode statements 704 through 868.

The processing for each item is straightforward and will only be discussed in general terms. Statements 704 through 866 check whether the specified characteristics apply to the item being processed. For each detected characteristic, the associated weight from the Characteristic Priority Table is added to the priority value for the item. Once the item is checked it is inserted into the priority list for the transaction according to its priority value as specified in statement 868.

Appendix B shows the general pseudocode processing for Amount Rekey (Step 206 of FIG. 19) processing as improved by the present invention. Generally, the processing entails presenting the images to the rekey operator in an order in which the items which are most likely to be the cause of the out-of-balance transaction are displayed first. Once an amount is rekeyed and the transaction thereafter balances, the rekey is complete for this transaction. In this way, the transaction can be balanced much faster than if the items were simply presented to the rekey operator in a random order.

Pseudocode Statement 1002 of Appendix B specifies that the item with the highest priority value, as computed during Automatic Force Balancing, is to be retrieved from the priority list. Statement 1004 defines the loop control for the Statements 1006, 1008, and 1010 which follow. Namely, the processing defined by Statements 1006, 1008, and 1010 is to be performed until either the rekeyed amount causes the transaction to balance, or all the items in the priority list have been rekeyed.

Within loop 1004 the first processing performed is to display the item image for the rekey operator as specified in Statement 1006. Next, Statement 1006 specifies to read the amount entered by the rekey operator. After reading the reentered amount, Statement 1010 retrieves the item from the priority list with the next highest priority value.

Control then returns to the loop control Statement 1004 where the transaction is examined to determine whether the amount rekeyed has balanced the transaction. If the transaction is balanced or there are no more items in the priority list left to rekey, loop processing terminates. If the Amount Rekey (Step 206 FIG. 19) fails to balance the transaction, processing proceeds to Think Balancing (Step 208 FIG. 19).

It will be remembered from the discussion accompanying FIG. 15 that the balancing display screen includes windows displaying information for credit and debit items in the transaction. With the present invention, the items in an out-of-balance transaction are presented to the balancing operator in the order of the item most likely to be the source of an error to the item which is least likely to be the source of an error. Accordingly, the balancing operator can quickly identify and correct the item in error.

Referring to FIG. 15, the credit item information is displayed separately from the debit item information; the credit item information residing in the Credit List Window W3 and the debit item information residing in the Debit List Window W4. Within each of the respective Windows, W3 and W4, the item information is displayed in the order discussed in the previous paragraph. The presentation order is dependant upon an item's position in the priority list as determined by its priority value. Hence, the information for the debit item with the greatest priority value (as compared with the other debit items in the transaction) is displayed first, and the debit item with the least priority value is displayed last. Likewise, information for credit items displayed in a priority value relative order in the Credit List Window W3. Even though only one credit item is listed in the example transaction of FIG. 15, it will be apparent to those skilled in the art that a transaction could have multiple credit items.

While only one embodiment of the present invention has been described, it should be understood that those skilled in the art will recognize that alternate embodiments exists which fall within the scope and spirit of the claims set forth below.

We claim:

1. An improved method for balancing an out-of-balance transaction in a check image processing system, wherein one or more of the items in the out-of-balance transaction has an associated amount and may be the source of the error, the method comprising the steps of:

associating a different one of a plurality of weights with each of a plurality of different characteristics, wherein each of said plurality of different characteristics indicates a different type of error which may be causing the out-of-balance condition, and each of said plurality of weights indicates a different relative likelihood that said each of said plurality of different characteristics from said associating step is the source of the error in the out-of-balance transaction, and wherein said associating step includes the step of classifying said different characteristics into a first set of characteristics and a second set of characteristics, wherein said first set of characteristics is indicative of a greater likelihood of error than said second set of characteristics, and each of said plurality of different characteristics in said first set is descriptive of amounts which may be partially correct and each of said plurality of different characteristics in said second set is descriptive of the physical appearance of the amounts;

identifying which of said plurality of different characteristics are exhibited by each of the items;

detecting which ones of the items are suspect items, wherein a suspect item is an item for which at least one of said plurality of different characteristics from said identifying step was identified;

ranking each of said suspect items to indicate the relative likelihood that each of said suspect items is the source of the error, wherein the relative likelihood of a suspect item being the source of the error is determined by a characteristic exhibited by said suspect item and said one of said plurality of weights associated with said characteristic;

reentering the amounts for the items in the out-of-balance transaction until the transaction balances, wherein said reentering step begins with said suspect item which is the most likely source of the error and progresses toward the item which is the least likely source of error; and checking whether the transaction is balanced after each amount is reentered, whereby said reentering step is completed upon detection of the transaction being balanced.

2. The method of claim 1, wherein said first set of characteristics includes a significant-digit characteristic, a highest-risk-digit characteristic, an extra-digit characteristic, a common-MICR-misread characteristic, and a transposition characteristic.

3. The method of claim 2, wherein said second set of characteristics includes a hand-written characteristic, a machine-printed characteristic, a complex-cent characteristic, a dash-trailing characteristic, and a touching-characters characteristic.

4. An improved apparatus for balancing an out-of-balance transaction in a check image processing system, wherein one or more of the items in the out-of-balance transaction has an associated amount and may be the source of the error, comprising:

association means for associating a different one of a plurality of weights with each of a plurality of different characteristics, wherein each of said plurality of different characteristics indicates a different type of error which may be causing the out-of-balance condition, and each of said plurality of weights indicates a different relative likelihood that said each of said plurality of different characteristics is the source of the error in the out-of-balance transaction, said association means including classification means for classifying said plurality of different characteristics into a first set of characteristics and a second set of characteristics, wherein said first set of characteristics is indicative of a greater likelihood of error than said second set of characteristics, and each of said plurality of characteristics in said first set is descriptive of amounts which may be partially correct and each of said plurality of characteristics in said second set is descriptive of the physical appearance of the amounts;

identification means for identifying which of said plurality of different characteristics are exhibited by each of the items;

detection means responsive to said identification means for detecting which ones of the items are suspect items, wherein a suspect item is an item for which at least one of said plurality of different characteristics was identified by said identification means;

ranking means responsive to said detection means and interfaced with said plurality of weights for ranking each of said suspect items to indicate the relative likelihood that each of said suspect items is the source of the error, wherein the relative likelihood of a suspect item being the source of the error is determined by a characteristic exhibited by said suspect item and said one of said plurality of weights associated with said characteristic;

presentation means responsive to said ranking means for presenting for reentry the amounts for the items in the out-of-balance transaction, wherein said suspect items are presented beginning with said suspect item which is the most likely source of the error and progressing toward the item which is the least likely source of error; and checking means responsive to amounts reentered and interfaced with said presentation means for checking whether the transaction is balanced after each amount is reentered and signaling said presentation means that presentation of suspect items is complete.

5. The apparatus of claim 4, wherein said first set of characteristics includes a significant-digit characteristic, a highest-risk-digit characteristic, an extra-digit characteristic, a common-MICR-misread characteristic, and a transposition characteristic.

6. The apparatus of claim 5, wherein said second set of characteristics includes a hand-written characteristic, a machine-printed characteristic, a complex-cent characteristic, a dash-trailing characteristic, and a touching-characters characteristic.

* * * * *